United States Patent [19]

Blanding et al.

[11] Patent Number: 5,328,073
[45] Date of Patent: Jul. 12, 1994

[54] FILM REGISTRATION AND IRONING GATE ASSEMBLY

[75] Inventors: Douglas L. Blanding, Rochester; Matthew M. Branca, Victor; James C. Foote, Jr., York; Jeffrey C. Weller, Brockport, all of N.Y.

[73] Assignee: Eastman Kodak Company, Rochester, N.Y.

[21] Appl. No.: 903,689

[22] Filed: Jun. 24, 1992

[51] Int. Cl.⁵ .................. G03B 1/22; B65H 23/04
[52] U.S. Cl. .................. 226/27; 226/55; 226/57; 226/115; 352/194; 352/225
[58] Field of Search .................. 226/2, 4, 52, 55, 56, 226/57, 58, 27, 115, 117, 145; 352/225, 194; 242/209

[56] References Cited

U.S. PATENT DOCUMENTS

| | | | |
|---|---|---|---|
| 1,805,948 | 5/1931 | Lane . | |
| 2,418,943 | 4/1947 | Jones | 88/18.4 |
| 2,986,316 | 5/1961 | Petersen | 226/57 |
| 3,081,013 | 3/1963 | Walther | 226/57 |
| 3,128,027 | 4/1964 | Chandler | 226/57 |
| 3,151,521 | 10/1964 | Atkin et al. | 352/225 X |
| 3,303,981 | 2/1967 | Wiese | 226/56 |
| 3,410,466 | 11/1968 | Harris et al. | 226/6 |
| 3,418,042 | 12/1968 | Sigl | 353/18 |
| 3,712,725 | 1/1973 | Eckerdt | 353/68 |
| 3,776,626 | 12/1973 | Lewis | 226/55 X |
| 4,078,765 | 3/1978 | Bogli | 352/194 |
| 4,161,365 | 7/1979 | Anderson et al. | 355/75 |
| 4,360,254 | 11/1982 | Nyman et al. | 352/166 |
| 4,522,476 | 6/1985 | Renold | 352/225 |
| 4,575,226 | 3/1986 | Zahn et al. | 355/43 |
| 4,835,555 | 5/1989 | Maxwell | 352/194 |

Primary Examiner—Daniel P. Stodola
Assistant Examiner—Paul Bowen
Attorney, Agent, or Firm—Robert L. Randall

[57] ABSTRACT

A film registration and ironing gate assembly has a gate with a positioning location or aperture for focal positioning of an image frame of a strip film with edge perforations. Undersized first and second pins enter a pair of transversely aligned perforations of the film to register the image frame with the aperture. An undersized third pin enters a third perforation spaced along the film from the second pin and then pulls the film obliquely to a reference line extending between the first and second pins to nest against the first and second pins the perforations thereat and register the image frame precisely at the positioning location or aperture. A pair of flexible bands extending along the film edges adjacent the positioning location move progressively into incrementally increasing contact with the film to iron it and clamp its perforations against the gate. The pins register the image frame precisely with the positioning location, and the bands maintain the image frame in precise focal position thereat.

23 Claims, 8 Drawing Sheets

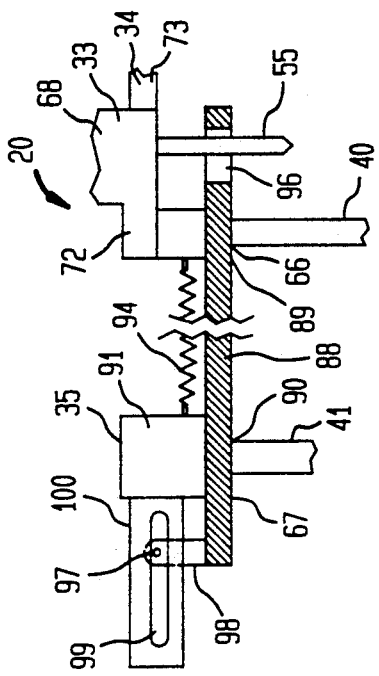
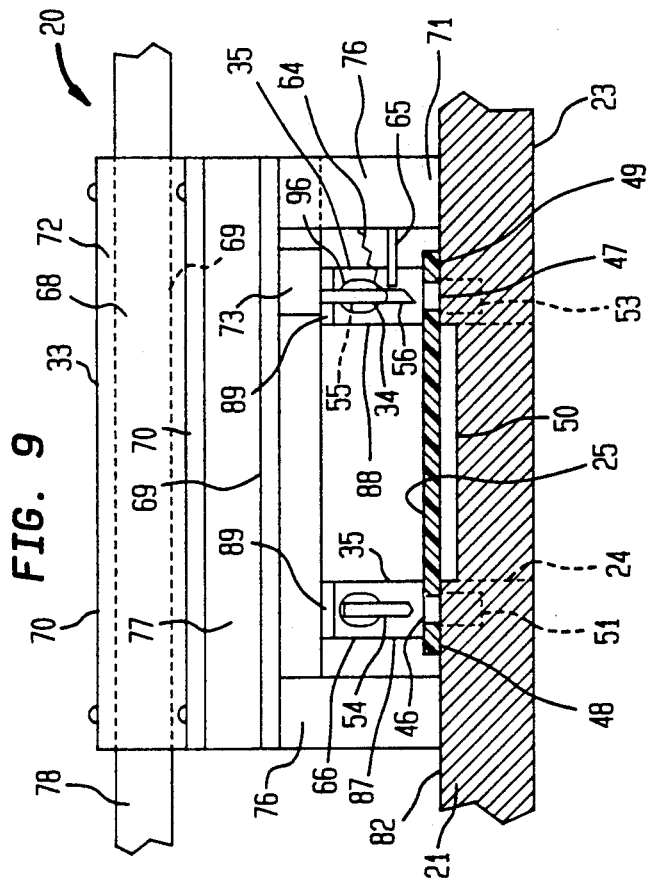
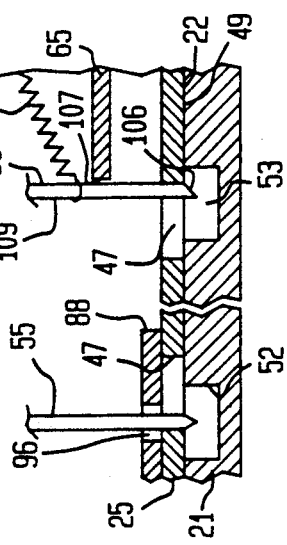
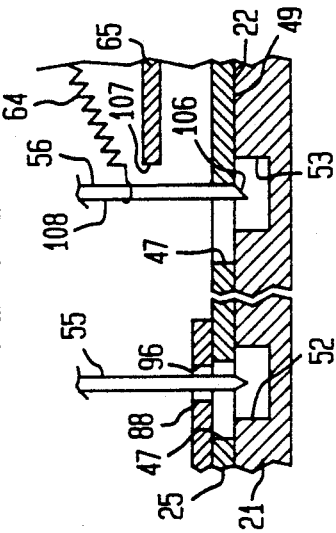
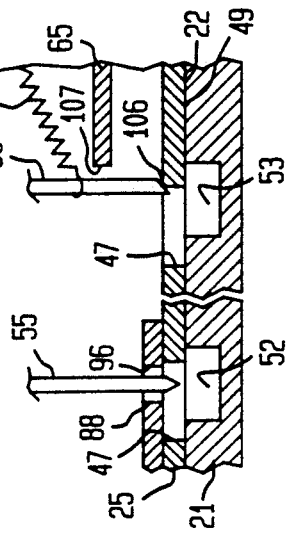

FILM REGISTRATION AND IRONING GATE ASSEMBLY

CROSS-REFERENCE TO RELATED APPLICATION

This application discloses and claims subject matter related to that disclosed and claimed in copending U.S. application Ser. No. 903,837, filed simultaneously herewith in the name of Douglass L. Blanding, entitled FILM REGISTRATION GATE ASSEMBLY.

FIELD OF THE INVENTION

This invention relates to a film registration and ironing gate assembly for strip film with edge perforations, and a method of use thereof.

BACKGROUND OF THE INVENTION

Typically, in using motion picture film for projecting, recording, printing, scanning and like purposes, the strip film is advanced to repeatedly register an image frame or an image frame to be created at a focal positioning location of a film gate for viewing or exposing the frame at an optical axis perpendicular to the plane of the frame location or aperture and intersecting the center of the frame location. The image frame is held in focal position at the frame location by a pressure plate, pads or similar clamping system providing a window for unobstructed viewing or exposing of the image frame at the aperture.

The strip film, whether a motion picture film or otherwise, is typically formed of longitudinally successive, uniform rectangular image frames bounded between a pair of parallel rows of equidistant, uniform rectangular edge perforations of common cross sectional size, each perforation in one row being transversely aligned with a corresponding perforation in the other row.

Each image frame is typically registered with the aperture or frame location by registration pins of about the same cross sectional size and shape as the edge projections of the strip film, and that enter into and are embraced by given perforations during the aligning of the image frame with the aperture. This accelerates wear of the pins and the perforations and also causes perforation tearing. As a result, play occurs between the worn pins and perforations, and/or between the pins and torn perforations, leading to imprecise registration of the image frame with the aperture. If undersized pins were initially used to offset these problems, imprecise registration of the image frame with the aperture would exist from the start, due to play between the pins and perforations.

This problem is acute in use of high resolution electronic scanning and printing systems, which require extremely precise location of the image frame at the imaging location or film gate aperture, especially for achieving special effects. The strip film must be maintained very straight, i.e., truly flat focally, along the optical scan line in order to remain in sharp focus. For this reason, the film is typically wrapped around a portion of a cylindrical (or cylindrical arc) surface defining a curved film gate having a gate aperture. The gate supports the perforated edges of the strip film so that the image frame is advanced to and positioned over the gate aperture or imaging location. A retractable clamp holds the image frame in position during use, and is retracted for advancing the next image frame.

In typical scan line operation, the curved gate is rotated about its cylindrical axis to traverse the scan line incrementally, i.e., one line at a time, for scanning each line portion of the image frame as the gate rotates relative to the scanner, printer or other system being used. As the scan line technique requires precise positioning of the image frame at each focal line thereof (as distinguished from its focal plane) during scanning (or recording), even slightly imprecise registration of the image frame at the gate is undesirable, as it detracts from the optical quality of operation. Tolerances of total film flatness of 0.002 inch, and frame to frame registration at the gate or aperture within 0.00025 inch (one pixel), are desirable.

Various film gate arrangements are known which register film image frames with a gate aperture, for projecting, recording, printing, scanning and the like operations. Examples of such arrangements are shown in the following prior art.

U.S. Pat. No. 4,575,226 (Zahn et al.) discloses a device for photographing varying size image frames of a microfilm strip to make a uniform size copy, via a fixed size aperture of a film gate on which a frame is seated by a plate with a variable size window.

U.S. Pat. No. 1,805,948 (Lane) discloses a motion picture film printer in which superimposed negative and positive strip films move in unison past a fixed size aperture of a curved film gate for exposure. A ring mask with different size windows is disposed rotatably at the aperture to vary the exposure size.

U.S. Pat. No. 4,161,365 (Anderson et al.) discloses a film negative holder for a photographic printer, formed of hinged plates with mating apertures. One plate has fixed pins and movable pins to align a negative with the apertures and the other has mating holes for the fixed pins and oversized holes for the movable pins.

U.S. Pat. No. 2,418,943 (Jones) discloses a motion picture projector or printer for strip film with parallel rows of transversely aligned edge perforations engaged by sprockets to move the image frames to the aperture of a film gate under the constant pressure of a plate. A pair of pins move into and out of given pairs of transversely aligned perforations to register each frame at the aperture. One pin is the same size as the perforations while the other pin is undersized transversely relative to the perforations so that both pins register the frame longitudinally whereas transverse play at the undersized pin permits the same size pin to register the frame laterally. This arrangement is prone to excess pin and perforation wear and perforation tearing.

U.S. Pat. No. 4,360,254 (Nyman et al.) discloses a slide production camera for strip film with edge perforations engaged by fixed pins on a film gate to register an image frame with the gate aperture. A reciprocating pressure pad seats the frame at the aperture on the pins, and stripper fingers on the pad lift the frame from the pins for advancing the film. This arrangement is prone to excess pin and perforation wear and perforation tearing.

U.S. Pat. No. 4,522,476 (Renold) discloses a motion picture camera or projector for strip film with edge perforations engaged by reciprocating pins passing through bores in a reciprocating pressure pad to register an image frame with the aperture of a film gate. Sloped tips on the pins enter adjacent perforations during film advance so that the pins fully engage the perforations at the end of the advance to register a frame at the aperture. Lifters raise the film from the gate and the pressure pad bores strip the perforations from the pins on retracting the pads and pins. This arrangement is prone to excess pin and perforation wear and perforation tearing.

Commonly assigned U.S. Pat. No. 3,712,725 (Eckerdt) discloses a slide projector with an adapter for projecting image frames of a strip film with sprocket driven edge projections. Each frame is registered at the aperture of a film gate and then seated by a frame gate that is retracted for film advance. This arrangement does not involve excess pin and perforation wear and perforation tearing.

Commonly assigned U.S. Pat. No. 3,418,042 (Sigl) discloses a crank driven claw that engages edge perforations of a strip film to advance the film for registering its image frames with the aperture of a film gate. The film is then held flat by a frame plate for exposure. This arrangement does not involve excess pin and perforation wear and perforation tearing.

It is desirable to avoid such pin and perforation wear and perforation tearing, yet register precisely each image frame of a strip film with the aperture of a film gate, and maintain the frame in precise focal position thereat.

SUMMARY OF THE INVENTION

The foregoing drawbacks have been obviated by use of registration means and pulling means to register precisely an image frame of a strip film with the imaging location of a film gate, and ironing and clamping means to iron and clamp the film against the gate to maintain the frame in precise focal position thereat.

In accordance with the present invention, a film registration and ironing gate assembly is provided for focal positioning of an image frame of a strip film with edge perforations. Briefly, the assembly comprises a film gate having a focal positioning location, registration means for registering a pair of edge perforations of the film with a reference line extending from a first point to a second point adjacent the positioning location, means at a third point for moving the film in a direction oblique to the reference line to register precisely the image frame with the positioning location by the registration means, and ironing and clamping means adjacent the positioning location for moving progressively toward the gate for incrementally increasing contact with the film to iron and clamp it against the gate to maintain the frame in precise focal position at the positioning location.

The registration means desirably has a pair of undersized pins that freely enter a pair of transversely aligned edge perforations on the strip film, and force applying means to move the film obliquely to align both perforations longitudinally against both pins and nest (corner) one perforation transversely against one pin, thus registering a film frame with the positioning location. The ironing and clamping means maintain the registered frame in the focal position.

In particular, the assembly is used for focal positioning of longitudinally successive, uniform rectangular image frames bounded between a pair of parallel rows of equidistant, uniform rectangular edge perforations of common cross sectional size, on a strip film, each perforation in one row being transversely aligned with a corresponding perforation in the other row. The assembly specifically includes a gate member, registration means, pulling means, and ironing and clamping means.

The gate member has a front face and a rear face with a rectangular, focal position defining positioning location, which may include a through aperture extending between the front and rear faces. The positioning location is complemental to an image frame or frame to be created of the strip film and has longitudinally extending first and second transverse sides and transversely extending third and fourth longitudinal sides. The front face has film perforation seating, and film frame focal positioning, first and second surfaces correspondingly extending longitudinally along the first and second transverse sides.

The registration means has first and second pins of smaller cross sectional size than the film perforations. The pins are disposed perpendicular to the first and second surfaces in fixed alignment with a reference line extending transversely from a first point on the first surface to a second point on the second surface, and at a fixed longitudinal location adjacent one longitudinal side of the positioning location or aperture. The disposition of the pins corresponds to the positioning of a pair of transversely aligned film perforations on the surfaces at the first and second points. The pins are arranged for entry into the perforations.

The moving or pulling means are provided for engaging the film at a position corresponding to a third point on the second surface spaced longitudinally from the second point for pulling the film under a tension force in a direction oblique to the reference line, upon entry of the pins into the perforations. This produces a resultant force on the perforation at the first point and on the perforation at the second point for registering precisely a film frame with the positioning location by the pins.

The ironing and clamping means comprise longitudinally extending means adjacent the front face and having a proximate end adjacent one longitudinal side of the positioning location and a distal end adjacent the other longitudinal side thereof. The ironing and clamping means are arranged for moving from a retracted position progressively toward the first and second surfaces for incrementally increasing contact with the film in a direction from the proximate end to the distal end. The ironing and clamping means iron the film in such direction and clamp against the first and second surfaces the film perforations adjacent the positioning location to maintain the frame in precise focal position at the positioning location.

The moving or pulling means advantageously includes resilient tension means arranged to produce a resultant force on the film at a transverse midpoint in alignment with the reference line. This force corresponds to a combination of a longitudinal force component and a transverse force component acting on the perforation at the first point to corner the perforation against the first pin in both longitudinal and transverse directions, and a longitudinal force component acting on the perforation at the second point to align the perforation against the second pin in the longitudinal direction.

More specifically, the third point corresponds to the positioning of a third film perforation on the second surface, and the pulling means has a third pin arranged for entry into the perforation at the third point and for unhindered displacement in the oblique direction.

The pulling means may include a cascade flexure cantilever arm with first and second unitary flexure arm floating sections. Each section has a pair of parallel flexure sheets fixed against relative movement therebetween and forming a common inner end and a common outer end. The first section extends in the longitudinal direction and the second section extends in the transverse direction. The inner end of one section is fixed against longitudinal and transverse displacement, and the outer end of that one section is fixed to the inner end of the other section. The outer end of that other section extends adjacent the second surface. The third pin depends from the outer end of that other section perpendicular to the second surface at the third point. The sections are independently flexible to displace the third pin in the oblique direction. Spring means are provided to pull the third pin in the oblique direction.

The three pins are arranged adjacent the front face to move from a retracted position toward the front face for entry into the perforations. Moving means are provided for moving the pins.

The moving means may include a unitary flexure cantilever support having a pair of parallel flexure sheets fixed against relative movement therebetween and forming a common fixed end and a common movable end movable from a retracted position toward the front face. The first and second pins depend from the movable end perpendicular to the first and second surfaces at the first and second points. The sheets are flexible to move the pins in unison while restricting each pin from longitudinal and transverse displacement.

The cascade flexure cantilever arm is desirably fixed to the movable end of the cantilever support remote from the first and second pins. The first and second sections of the arm are arranged so that the first section extends in longitudinal direction and the second section extends in transverse direction. The inner end of one section is fixed to the movable end of the support. The outer end of that one section is fixed to the inner end of the other section. The outer end of that other section extends adjacent the second surface, and the third pin depends therefrom perpendicular to the second surface at the third point. The arm sections are independently flexible to displace the third pin in the oblique direction, e.g., under the pull of spring means. A pin stop may be arranged to limit the extent of displacement of the third pin away from the first and second pins in the oblique direction.

Motion imparting means are provided for moving the movable end of the support to move the pins.

First, second and third clearance recesses may be defined in the first and second surfaces at the first, second and third points, and the pins arranged to move into the recesses upon entering the perforations.

The ironing and clamping means may include corresponding first and second flexible force applying bands extending adjacent the first and second surfaces. Each band has a proximate end carried by the movable end of the support and a distal end carried by a boom for progressive movement from a retracted position toward the surfaces independently of and successive to the movement of the movable end of the support. The bands are disposed to move progressively toward the surfaces for incrementally increasing contact with the film in a direction from the proximate ends to the distal ends of the bands. This irons the film progressively in such direction and clamps the film perforations progressively against the surfaces.

The ends of the bands may be carried at the movable end of the support and at the boom so as to permit compensating longitudinal movement of the bands relative to the movable end and to the boom. Longitudinal spring means may be arranged on the bands to urge the bands progressively into contact with the adjacent film perforations for ironing and clamping action.

Motion imparting means are provided for moving the boom to move the distal ends of the bands.

The gate member may have a curved front face corresponding to at least an arc portion of a cylinder having an axis parallel to the longitudinal sides of the positioning location or aperture. The bands are arranged to conform to the curved front face in the vicinity of the positioning location or aperture.

In general, the ironing and clamping means comprise corresponding first and second flexible force applying bands extending adjacent the first and second surfaces. Each band has a proximate end adjacent one longitudinal side of the aperture and a distal end adjacent the other longitudinal side thereof. The bands are disposed for progressive movement from a retracted position toward the surfaces for incrementally increasing contact with the film in a direction from the proximate ends to the distal ends of the bands to iron the film progressively in such direction and clamp the film perforations progressively against the surfaces. The longitudinal spring means on the bands urge them progressively into contact with the perforations for ironing and clamping action.

The curved gate member may be mounted for forward rotation to move through an arc portion of a single revolution corresponding to the longitudinal spacing of the film frames, with the film clamped to the gate member for movement therewith. An arresting pin may be provided for releasable insertion into a film perforation. This pin arrests the film from return rotational movement, upon moving the other pins and ironing and clamping means away from the film perforations. This allows reverse rotation of the gate member through said arc portion to reposition the aperture at the next successive film frame. In this way, the film is automatically advanced one frame during each forward rotation of the gate member.

The invention also concerns a method for focal positioning at the focal positioning location of a frame of a strip film of the described type. The method comprises the steps of:

(A) isolating longitudinally a pair of transversely aligned film perforations of the strip film by the first and second pins at the first and second points along the reference line extending transversely of the longitudinal direction of the strip film and positioned at a fixed longitudinal location adjacent the positioning location so as to register a film frame with the positioning location;

(B) pulling the perforation isolated film at the third point spaced longitudinally from the second point under a tension force in a direction oblique to the reference line to produce a resultant force on the perforation at the first point and on the perforation at the second point for registering precisely the film frame with the positioning location by the pins; and (C) progressively longitudinally ironing and clamping the so pulled film in a direction from a proximate longitudinal location adjacent one longitudinal side of the aperture to a distal longitudinal location adjacent the other longitudinal side thereof to maintain the frame in precise focal position at the positioning location.

The tension force is advantageously applied to produce a resultant force on the film at the transverse midpoint in alignment with the reference line, as earlier described. The ironing and clamping is progressively effected in a direction from a proximate location adjacent the first and second points and remote from the third point to a distal location remote from the first, second and third points.

Where the gate member has a curved front face corresponding to at least an arc portion of a cylinder with an axis parallel to the longitudinal sides of the aperture, the gate member may be forwardly rotated to move through an arc portion of a single revolution corresponding to the longitudinal spacing of the film frames, while the film is clamped thereto for movement therewith. Then, the film may be unclamped and held against return rotational movement, while the gate member is rotated in the reverse direction through said arc portion to reposition the aperture at the next successive film frame. The film is thus automatically advanced one frame during each forward rotation of the gate member.

The invention will be more readily understood from the following detailed description taken with the accompanying drawings and claims.

BRIEF DESCRIPTION OF THE DRAWINGS

FIG. 9 is an end view of part of the assembly of FIG. 3;

FIG. 10 is a side view of a part of the assembly of FIG. 3;

FIGS. 14, 15 and 16 are schematic views showing successive stages of operation of the registration means and pulling means;

It is noted that the drawings are not to scale, some portions being shown exaggerated to make the drawings easier to understand.

DETAILED DESCRIPTION

Figure 1:
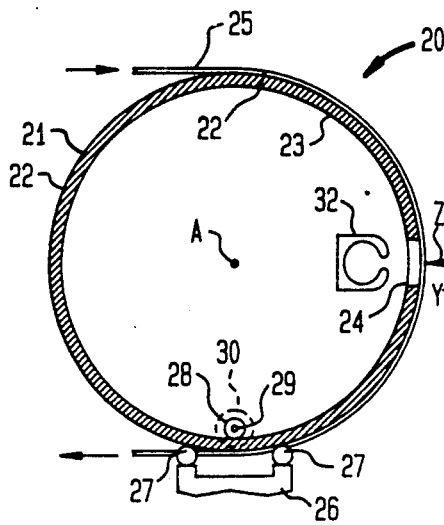
FIG. 1 is a side view of a film registration and ironing gate assembly in accordance with an embodiment of the invention as used for strip film image scanning.

Referring now to FIG. 1, there is shown a film registration and ironing gate assembly 20 in accordance with one embodiment of the invention used with a scanner system. Assembly 20 has a gate member 21, front face 22, rear face 23, film positioning location or aperture 24, strip film 25, gate mounts 26, gate rollers 27, drive roller 28, gate shaft 29, gate motor 30, scanner and lens system 31, illuminator 32, and axes A, X, Y and Z.

Figure 2:
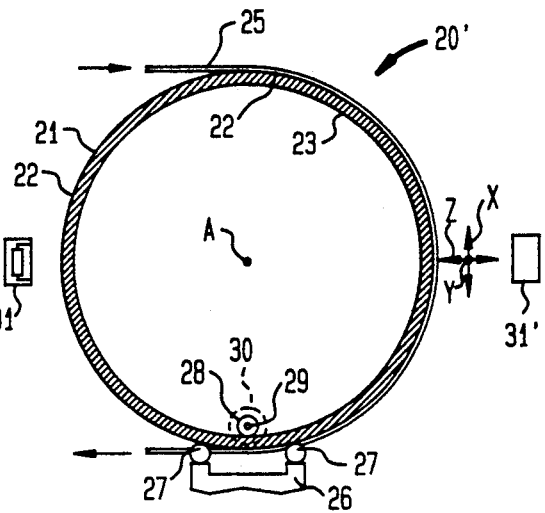
FIG. 2 is a view similar to FIG. 1 of the assembly as used for strip film image recording.

Referring now to FIG. 2, there is shown a recorder assembly 20' identical to scanner assembly 20, except that it is used with a recorder or printer light source 31' instead of scanner and lens system 31 and illuminator 32.

While the description herein is directed to scanner assembly 20, it applies equally to recorder assembly 20'. As scanner and lens systems and recorder or printer systems are known, and operate in conventional manner with the assembly of the invention, such scanner and recorder or printer system operation need not be further described. In the scanner it is necessary to project light through the film onto a sensor and thus an aperture is necessary. However, when the apparatus is being used in a printer, such an aperture is not necessary and the registration location is referred to as the film positioning location.

Assembly 20 includes a curved gate member 21, shown in section in FIG. 1, e.g., a hollow cylinder, having a curved (cylindrical) outer front face 22 and inner rear face 23, with a through aperture 24 extending therebetween. Gate member 21 desirably constitutes at least an arc portion of a cylinder having a rotational axis A. Thus, gate member 21 need not be a complete cylinder, but instead may define only an arc portion thereof, e.g., of about 30 to 90 degrees or more about the cylinder axis A. Assembly 20 is shown with gate member 21 extending horizontally for rotation about a horizontal axis A. However, it may be used in any spatial orientation, e.g., arranged for rotation about a vertical axis A.

Gate member 21 is mounted for rotation on stationary gate mounts 26 via gate rollers 27. Drive roller 28 is carried on gate shaft 29 to engage frictionally a side edge of rear face 23. Gate shaft 29 is connected to gate motor 30 (shown in dashed line in FIG. 1), which is typically a stepper motor, for forward and reverse rotation. Gate motor 30 rotates gate member 21 relative to mounts 26 (and to the scanner) in forward direction for a given arc amplitude scanning cycle, and then in reverse direction for an equal return arc to the starting point for the next scanning cycle.

While the description herein refers to a movable gate member and stationary scanner, a movable scanner and stationary gate member may be used instead. This is because the scanning operation only requires relative motion therebetween. Typically, the reciprocating relative motion extends along an arc of about 40 degrees, but may be more or less.

Aperture 24 defines a focal position for the image frames of strip film 25 and is complemental in size and shape thereto. The radius of curvature of gate member 21 with respect to axis A is comparatively large relative to the longitudinal dimension of aperture 24 and of the image frames of film 25, in the direction of the longitudinal axis X (the running direction of film 25).

However, the scanner reciprocates along the transverse axis Y, in the same way as one reads a line of text, so that the scan line is perpendicular to axis X (and to the plane of the paper of FIG. 1). Thus, the film image at the film positioning location or aperture 24 is exactly parallel to the scan line throughout each scanning cycle. Scanning is effected in alignment with an optical axis which, as shown in FIG. 1, coincides with an axis Z extending in a radial direction through aperture 24. Axis Z is perpendicular to each of axes A, X and Y, so that each of axes A and Y are perpendicular to axes X and Z, and are parallel to each other.

As used herein, axes X, Y and Z refer to the spatial orientation of a reference point or direction relative to axis A. The reference point may have a degree of freedom in a linear direction along, or in a rotational direction about, a given axis X, Y or Z. Axes X, Y and Z are perpendicular to each other, whether axis Z coincides with the optical axis through aperture 24 or is otherwise located. In all cases, an axis X extends in a plane which is perpendicular to and intersects axes A and Y, and indicates the longitudinal (length) direction, while an axis Y is parallel to and extends in a common plane with axis A and indicates the transverse (width) direction and an axis Z is perpendicular to and intersects axes A and Y, and indicates a (thickness) direction toward and away from axis A.

Film 25 is mounted on gate member 21 so as to wrap around a cylindrical arc portion thereof in stable contact with front face 22 and in straight alignment along an axis X. Film 25 may be mounted between feed and takeup sprockets or other means (not shown) for advance in the longitudinal running direction of axis X to deliver successive image frames to aperture 24 for scanning in known manner. Initially, while gate member 21 is stationary at the starting point, film 25 is advanced by the sprockets to position an image frame at aperture 24. Then, the sprockets and gate motor 30 operate at concordant speeds to advance film 25 while in contact with front face 22, and to rotate gate member 21 in forward direction, in unison, for a scanning cycle. At the end of the cycle, while film 25 is held stationary, as later described, gate motor 30 rotates in reverse direction to return gate member 21 to the starting point for the next scanning cycle.

Referring now to FIGS. 3 to 18, there is shown an assembly 20 including a gate member 21, front face 22, rear face 23, aperture 24, strip film 25, gate mounts 26, gate rollers 27, drive roller 28, gate shaft 29, gate motor 30, registration means 33, pulling means 34, ironing and clamping means 35, cam 36, cam surface 37, cam shaft 38, cam motor 39, cam followers 40 and 41, arresting means 42, solenoid 43, image frames 44 and dividers 45, perforations 46 and 47, surfaces 48 and 49, groove 50, recesses 51, 52 and 53, pins 54, 55 and 56, sides 57, 58, 59 and 60, reference line 61, oblique direction 62, midpoint 63, spring 64, stop 65, ends 66 and 67, support 68, sheets 69 and 70, ends 71 and 72, arm 73, sections 74 and 75, bridge 76, blocks 77 and 78, sheets 79, ends 80 and 81, elbow 82, sheets 83, ends 84 and 85, elbow 86, bands 87 and 88, ends 89 and 90, boom 91, springs 92, 93, 94 and 95, slots 96, pins 97, brackets 98, slots 99, noses 100, sheets 101, ends 102 and 103, pin 104, cam 105, tip 106, and edge 107.

Also shown are positions 108 and 109, distance 110, center 111, distance 112, axes A, X, Y and Z, force components $F_x$ and $F_y$, force $F_n$, and angle Ob.

Figure 3:
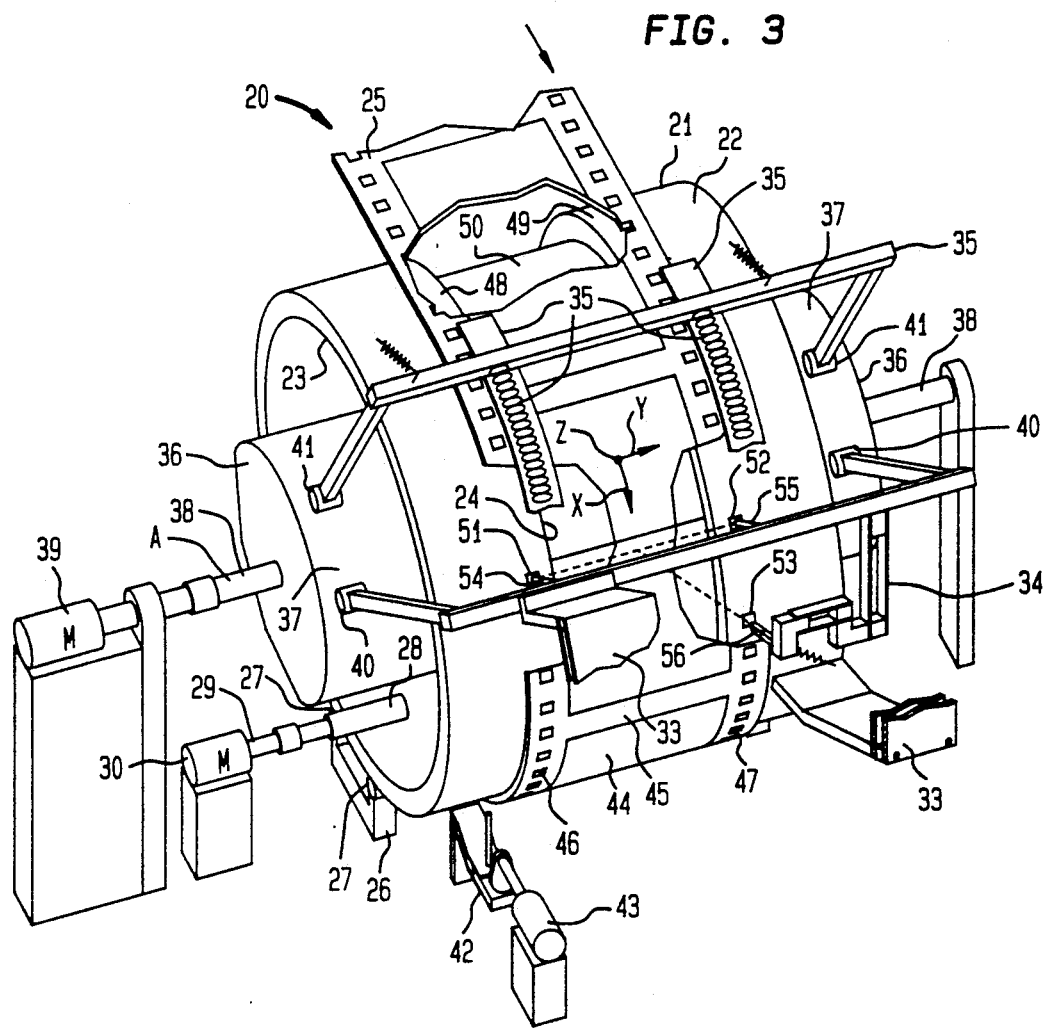
FIG. 3 is a perspective view of the assembly of FIG. 1, showing portions of the registration means, pulling means, and ironing and clamping means on the gate member.
Figure 4:
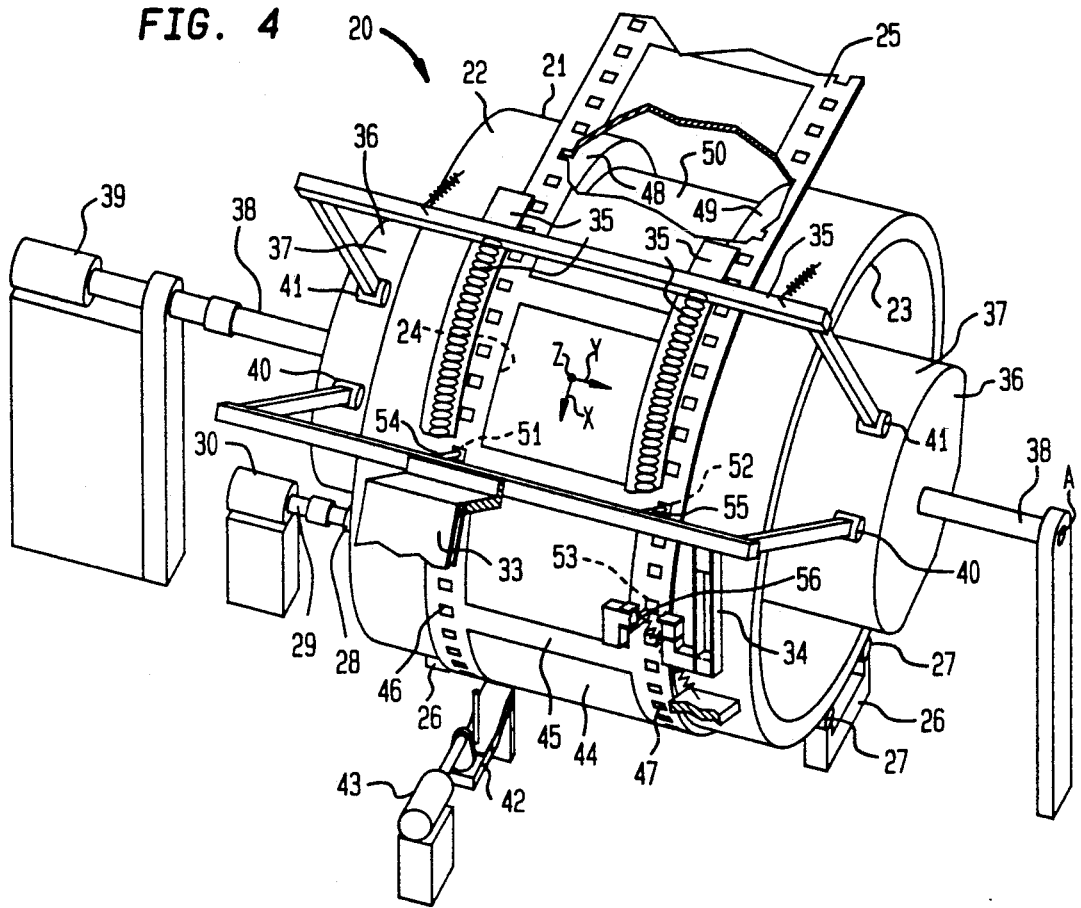
FIG. 4 is a view of the assembly of FIG. 3, as seen from another direction.
Figure 6:
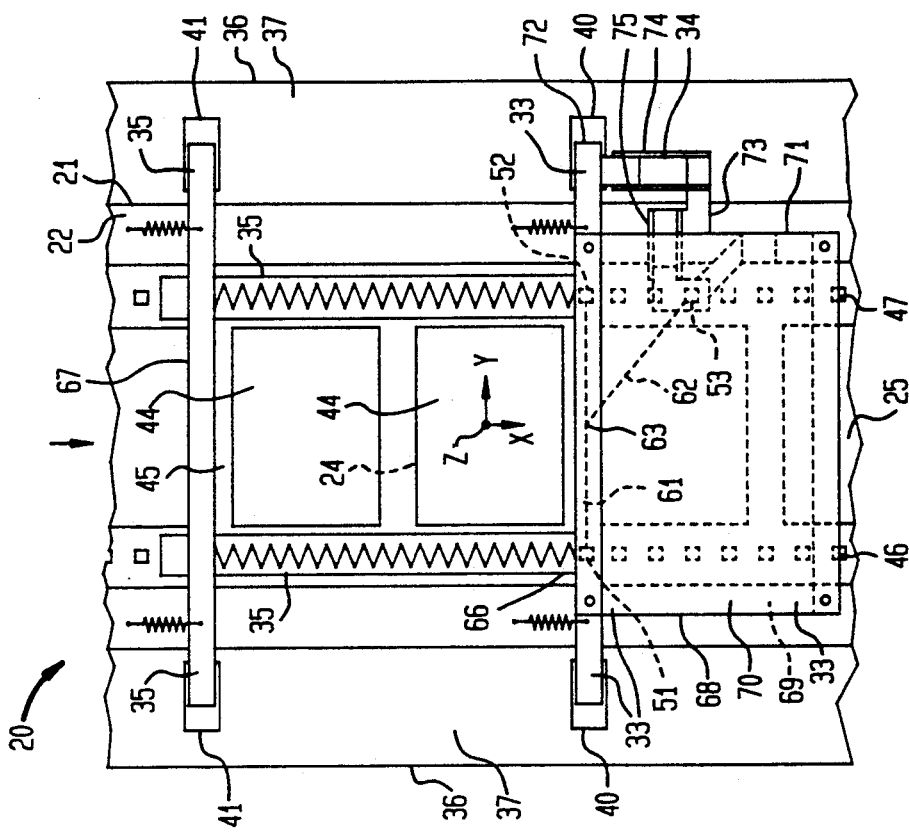
FIG. 6 is a view similar to FIG. 5.

Referring now to FIGS. 3 and 4, there is shown the stable positioning of gate member 21 of assembly 20 on gate mounts 26 for limited arc reciprocal rotation. Gate member 21 is formed in this embodiment as a complete hollow cylinder having an outer front face 22 and an inner rear face 23, with a through aperture 24 extending therebetween. Strip film 25 is wrapped around an arc portion of front face 22 so as to overlie aperture 24. Gate member 21 is supported for rotation about axis A by opposed sets of gate rollers 27 which frictionally engage the opposed end portions of front face 22 outwardly of film 25 to prevent axial displacement of gate member 21 relative to the optical axis which coincides with the Z axis shown in FIGS. 3 and 4. Drive roller 28 on gate shaft 29 frictionally engages rear face 23 to rotate gate member 21 via stationarily fixed gate motor 30 on a support surface (not shown).

Registration means 33, pulling means 34, and ironing and clamping means 35, only partially shown in FIGS. 3 and 4, are stationarily fixed to gate member 21 for common rotation therewith and for individually moving from respective retracted positions toward front face 22 for later described purposes. Rotary cam 36, having a cam surface 37 of predetermined contour, extends through the hollow interior of gate member 21 spaced from rear face 23, and is carried on cam shaft 38 for rotation about axis A via stationarily fixed cam motor 39 on a support surface (not shown).

Gate motor 30 and cam motor 39 are typically stepper motors, and each is arranged to rotate in forward and reverse directions independently of the other for correspondingly rotating gate member 21 and cam 36, i.e., in clockwise and counterclockwise directions about axis A. Registration means 33 and pulling means 34 are supported to move toward and away from front face 22 under the action of cam surface 37 on cam followers 40 during pertinent relative rotation between cam 36 and gate member 21. Ironing and clamping means 35 is also supported to move toward and away from front face 22 under the action of cam surface 37 on cam followers 41 during such relative rotation. Registration means 33 and pulling means 34 are arranged to move independently of the moving of ironing and clamping means 35.

Arresting means 42 is stationarily fixed to a support surface (not shown), and located adjacent one row of perforations 46, e.g. perforations 46, of film 25 on gate member 21 at a tangent point remote from the range of reciprocal rotation of registration means 33, pulling means 34 and ironing and clamping means 35. Arresting means 42 is movable via a rotary cam solenoid 43 from a retracted position into engagement with a perforation 46 at the tangent point to arrest film 25 from movement during movement of gate member 21 in reverse direction, as later described.

Aperture 24 is located in a longitudinally extending flat groove 50 that separates opposed longitudinally extending first and second surfaces 48 and 49 on front face 22. The adjacent portions of surfaces 48 and 49 at groove 50 serve as longitudinal rails for the first and second rows of edge perforations 46 and 47 of film 25 to span film 25 across groove 50 and space its medial image frames 44, separated by frame dividers 45, from gate member 21 to prevent scratching of the image frames. First, second and third clearance recesses 51, 52 and 53 are formed in front face 22 to receive with clearance first, second and third pins 54, 55 and 56 of registration means 33 and pulling means 34, as the case may be. Pins 54, 55 and 56 are arranged adjacent front face 22 to move from a retracted position toward front face 22 for entry into corresponding perforations 46 and 47, as later described.

Referring now to FIGS. 5 to 18, there is shown the arrangement of registration means 33, pulling means 34 and ironing and clamping means 35 in relation to the film positioning location or the aperture 24 and film 25 for registering precisely an image frame 44 with the film positioning location and for maintaining the registered image frame in precise focal position thereat.

Figure 5:
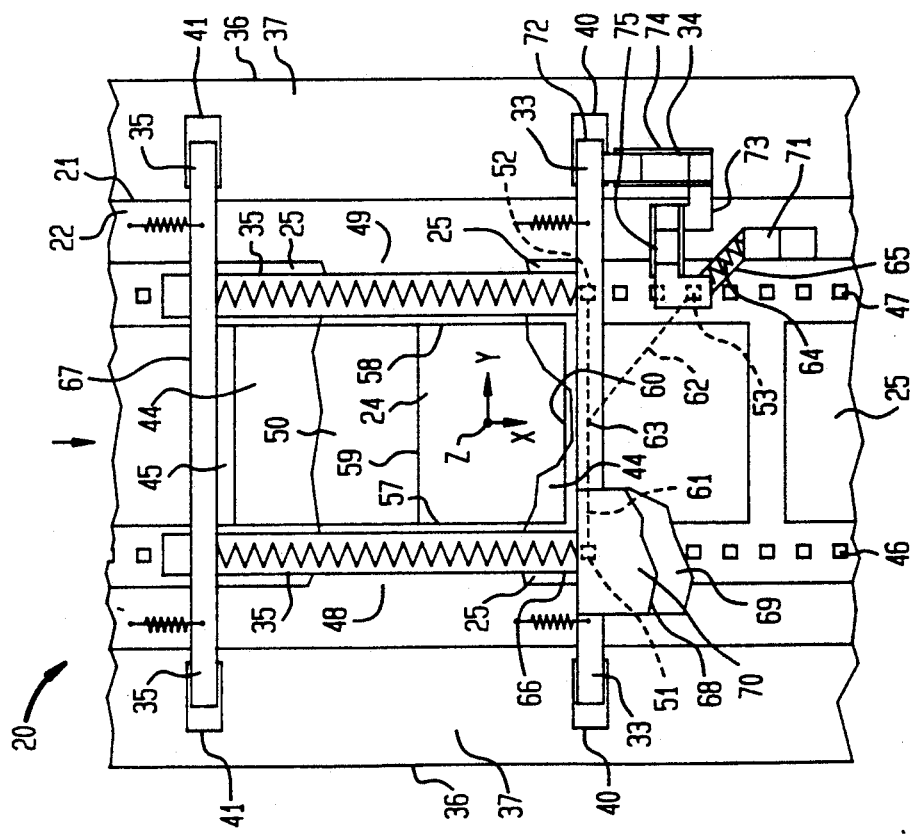
FIG. 5 is a plan view of part of the assembly of FIG. 3.
Figure 18:
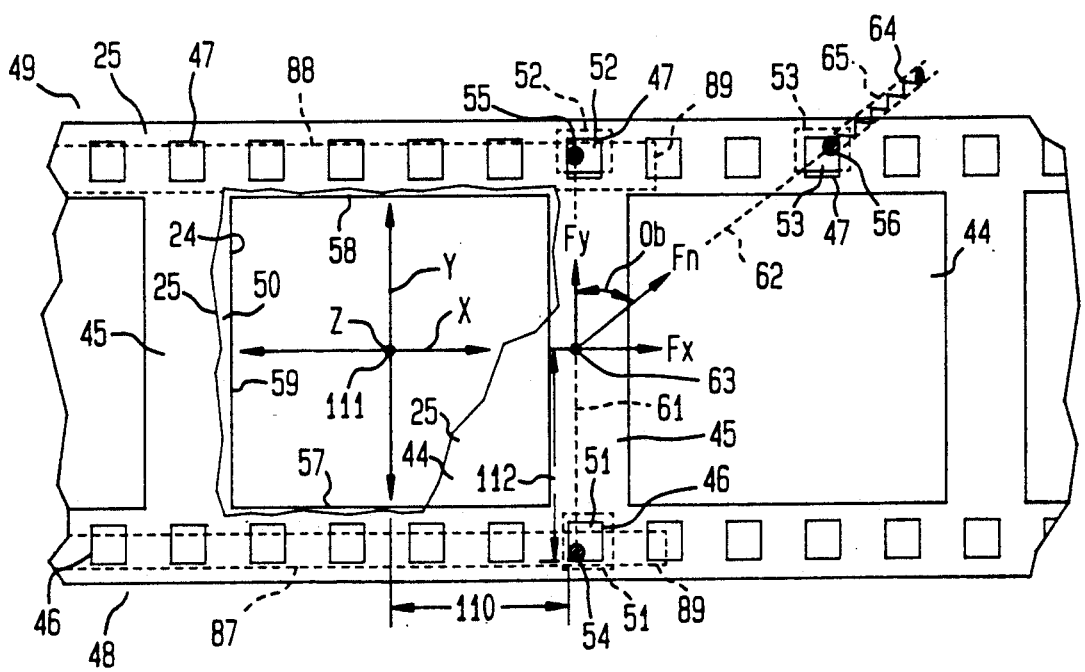
FIG. 18 is a schematic view showing the registering of a strip film image frame by the registration means and pulling means.

As is clear from FIGS. 5 and 18, the film positioning location and the aperture 24 are of complemental rectangular size and shape to image frames 44, having longitudinally extending first and second parallel transverse sides 57 and 58, and transversely extending third and fourth parallel longitudinal sides 59 and 60. Longitudinal sides 59 and 60 are parallel to rotational axis A.

As is clear from FIGS. 5 to 7, 9, 13 and 18, the positioning location and the aperture 24 define a focal position for an overlying image frame 44 registered therewith, in conjunction with the adjacent portions of first and second surfaces 48 and 49 which extend longitudinally along first and second transverse sides 57 and 58, to define film perforation seating, and film frame focal positioning, rails.

As is clear from FIGS. 5 to 8 and 18, first recess 51 is formed at a first point in first surface 48 and second recess 52 is formed at a second point in second surface 49 in alignment with an imaginary reference line 61 (shown in dashed line in FIGS. 5 to 8 and 18) extending transversely from the first to the second point. Reference line 61 is situated at a longitudinal location adjacent longitudinal fourth side 60 of aperture 24. First and second recesses 51 and 52 correspond to the positioning of a pair of transversely aligned film perforations 46 and 47 at the first and second points on surfaces 48 and 49 of front face 22.

As is clear from FIGS. 5 to 16 and 18, registration means 33 includes first and second pins 54 and 55 that move from a retracted position toward front face 22 to enter corresponding perforations 46 and 47 at the first and second points and project into first and second recesses 51 and 52. Pins 54 and 55 are of smaller cross sectional size than perforations 46 and 47 and are disposed perpendicular to surfaces 48 and 49 in fixed alignment with reference line 61 and at a fixed longitudinal location adjacent fourth side 60 of aperture 24. Upon entering the perforations 46 and 47 at the first and second points, pins 54 and 55 serve to align the image frame 44 at aperture 24 in longitudinal direction relative to reference line 61. Pins 54 and 55 are also of smaller cross sectional size than recesses 51 and 52 so as to be spaced from all sides of the recesses in any position of pin movement.

Third recess 53 is formed at a third point in second surface 49 spaced longitudinally from second recess 52 at the second point. The third point corresponds to the positioning of a third film perforation 47 on second surface 49 of front face 22. Third recess 53 is located so as to define an oblique resultant force line or direction 62 (shown in dashed line in FIGS. 5-8 and 18) extending to the midpoint 63 of reference line 61.

Pulling means 33 includes third pin 56 that moves from a retracted position toward front face 22 to enter the corresponding perforation 47 at the third point and project into third recess 53. Third pin 56 is arranged for displacement in oblique direction 62 under the tension of a pulling spring 64. Pin 56 is of smaller cross sectional size than perforations 47 and is disposed perpendicular to surface 49 initially in fixed alignment with recess 53 at the third point at a rest position against a stop 65 stationarily fixed to gate member 21.

As it enters the perforation 47 at the third point, pin 56 is first displaced from stop 65 in oblique direction 62 toward midpoint 63 to a starting position for aligning the image frame 44 at aperture 24 in longitudinal direction relative to reference line 61 and in transverse direction relative to midpoint 63. Third pin 56 is then displaced from the starting position in oblique direction 62 away from midpoint 63 under the tension of spring 64 to pull film 25 in oblique direction 62. This produces a resultant force on the perforation 46 at the first point entered by first pin 54 and on the perforation 47 at the second point entered by second pin 55 to register precisely the image frame 44 with aperture 24 by the first and second pins. Pin 56 is also of smaller cross sectional size than recess 53 so as to be spaced from all sides of the recess in any position of pin movement.

Ironing and clamping means 35 is formed as a longitudinally extending means having a proximate end 66 adjacent longitudinal side 60 of aperture 24, and a distal end 67 adjacent longitudinal side 59 of aperture 24. Ironing and clamping means 35 is arranged to move from a retracted position progressively toward first and second surfaces 48 and 49 for incrementally increasing contact with film 25 in a direction from proximate end 66 to distal end 67. Ironing and clamping means 35 serves to iron film 25 in that direction and clamp against surfaces 48 and 49 the perforations 46 and 47 adjacent aperture 24. The image frame 44, registered with aperture 24 by pins 54, 55 and 56, is maintained in precise focal position thereat by ironing and clamping means 35.

Registration means 33 includes moving means in the form of a unitary flexure cantilever support 68 for first and second pins 54 and 55. Support 68 is stationarily fixed to gate member 21 and has a pair of parallel inner and outer flexure sheets 69 and 70 fixed against relative movement therebetween and forming a common fixed end 71 on support 68 and a common movable end 72 connected to cam followers 40. First and second pins 54 and 55 depend from movable end 72 perpendicular to surfaces 48 and 49 at the first and second points. Movable end 72 is movable via cam followers 40 from a retracted position toward front face 22 in a Z axis direction for entry of pins 54 and 55 into perforations 46 and 47 at the first and second points and into recesses 51 and 52.

Figure 11:
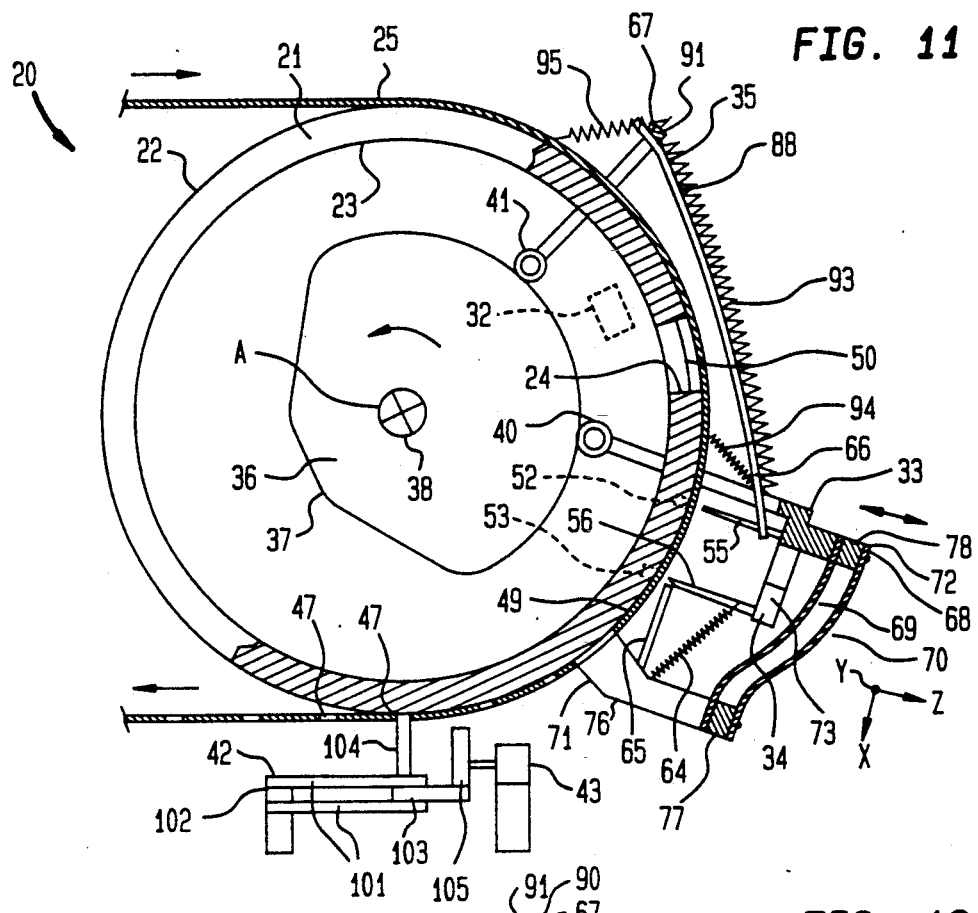
FIGS. 11, 12 and 13 are schematic views showing stages of operation of the assembly of FIG. 3.
Figure 12:
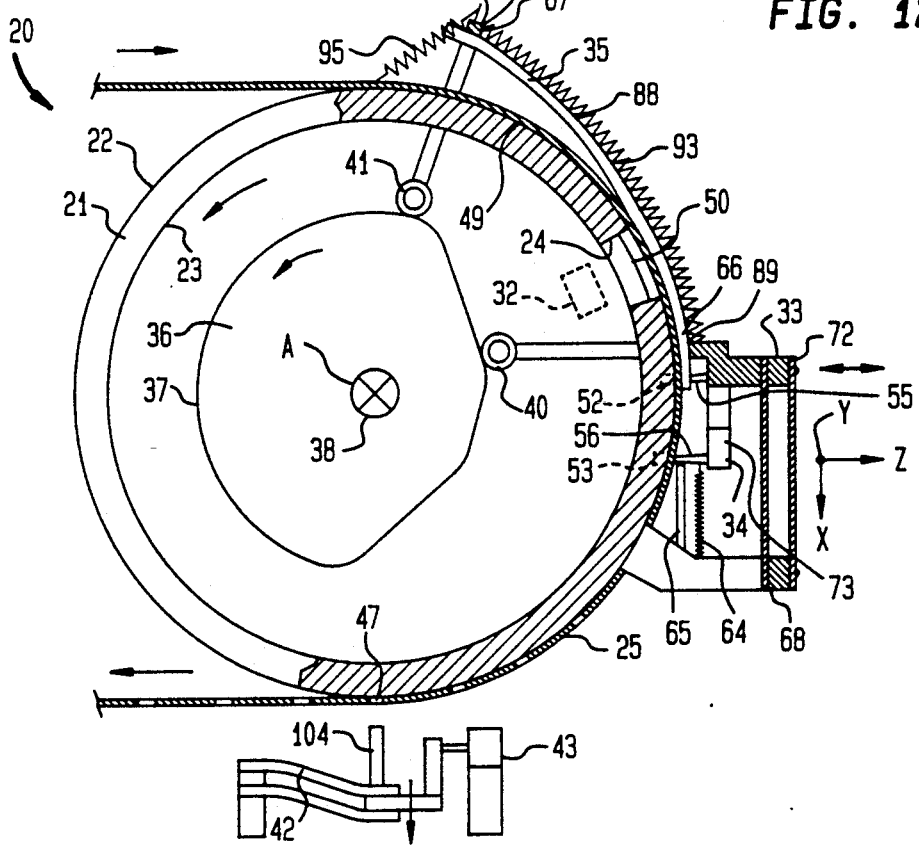
Figure 13:
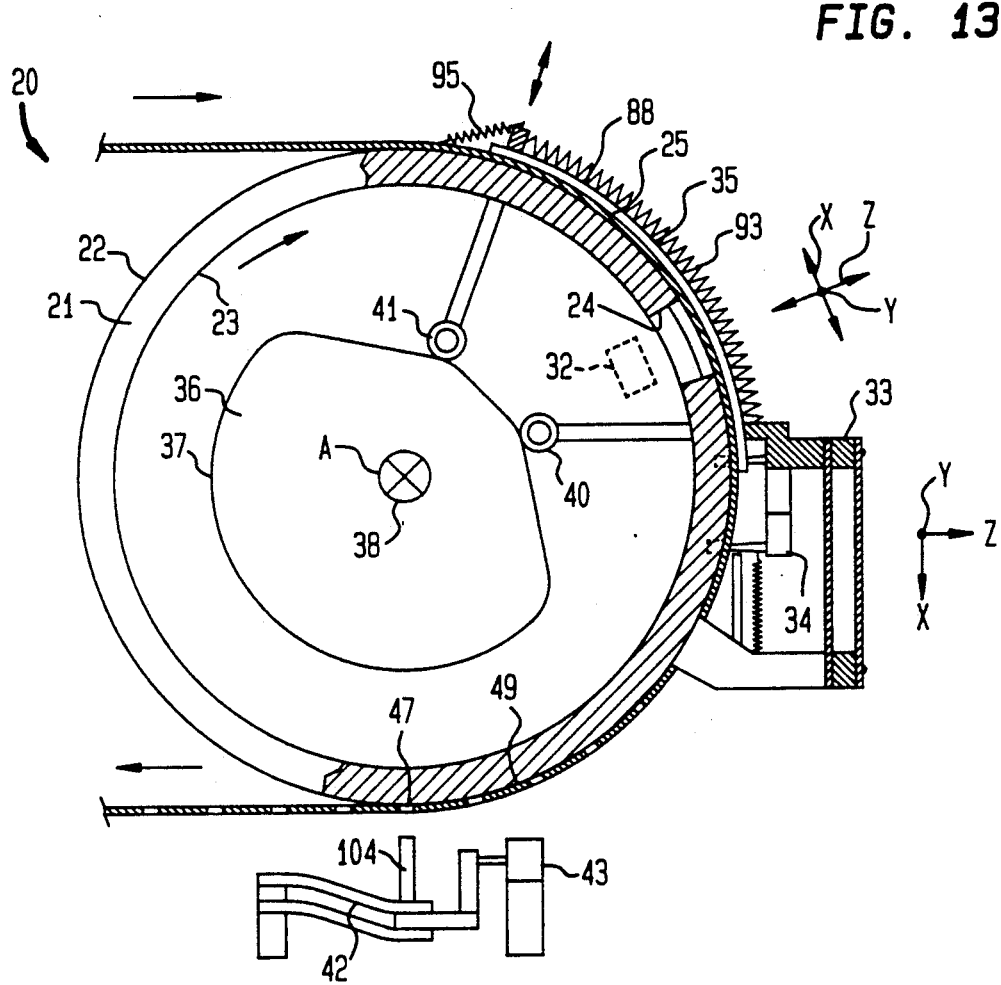

Each of flexure sheets 69 and 70 comprises a resilient sheet, e.g., of metal or plastic, which cannot be displaced within its own plane but which can be flexed by a force in a direction crosswise of its plane, e.g., by the action of cam surface 37 on cam followers 40 to move movable end 72 of support 68, and thus sheets 69 and 70 in unison, as cam 36 rotates relative to gate member 21, as shown in FIGS. 11 to 13. Upon removing the flexing force, sheets 69 and 70 normally return to unflexed disposition.

Sheets 69 and 70, which extend generally parallel to front face 22, are flexible to move pins 54 and 55 in unison in a Z axis direction while restricting each pin from longitudinal and transverse displacement in X and Y axes directions or in a rotational direction about any Z axis.

Pulling means 34 includes moving means in the form of a cascade flexure cantilever arm 73 for third pin 56 having first and second unitary flexure arm floating sections 74 and 75. Arm 73 is fixed to movable end 72 of support 68 remote from first and second pins 54 and 55 for conjoint movement with movable end 72 from a retracted position toward front face 22 in a Z axis direction. Arm 73 is arranged so that section 74 is displaceable generally transversely in a Y axis direction and section 75 is displaceable generally longitudinally in an X axis direction in cooperating cascade manner to displace third pin 56 in oblique direction 62.

Support 68 is mounted via a rigid transverse bridge 76 stationarily fixed to gate member 21 at first and second surfaces 48 and 49 so as to overlie and straddle film 25. Sheets 69 and 70 are interconnected by a base spacer block 77 at fixed end 71 fixed to bridge 76, and by a free spacer block 78 at movable end 72.

Section 74 has a pair of parallel flexure sheets 79 fixed against relative movement therebetween and forming a common inner end 80 fixed at free block 78 of support 68, and a common outer end 81 fixed at an intermediate elbow 82. Section 75 also has a pair of parallel flexure sheets 83 fixed against relative movement therebetween and forming a common inner end 84 fixed at intermediate elbow 82, and a common outer end 85 fixed at an end elbow 86 adjacent second surface 49. Third pin 56 depends from end elbow 86 perpendicular to surface 49 at the third point.

Arm 73 moves toward front face 22 together with movable end 72 of support 68, and thus end elbow 86 moves third pin 56 from a retracted position toward front face 22 as first and second pins 54 and 55 on movable end 72 move from a retracted position toward front face 22. Third pin 56 enters the perforation 47 and third recess 53 at the third point as first and second pins 54 and 55 enter the perforations 46 and 47 and first and second recesses 51 and 52 at the first and second points.

Upon entry of third pin 56 into the perforation 47 at the third point, it is displaced from stop 65 by contact with the entered perforation 47, as earlier noted. Sheets 79 and 83 of arm sections 74 and 75 extend generally perpendicular to front face 22, to sheets 69 and 70 of support 68, and to each other. Sheets 79 and 83 are flexible to permit spring 64 to displace pin 56 in oblique direction 62 toward stop 65. Stop 65 limits displacement of third pin 56 away from first and second pins 54 and 55 in oblique direction 62. Sheets 79 are flexible for generally transverse displacement in a Y axis direction independently of sheets 83, and sheets 83 are flexible for generally longitudinal displacement in an X axis direction independently of sheets 79.

Sheets 69 and 70 of support 68 are fixed against relative movement therebetween by base block 77 fixed to bridge 76 at their fixed end 71, and by free block 78 at their movable end 72. Cam followers 40 generally radially extend toward axis A from free block 78 at movable end 72 and slidingly engage cam surface 37 as cam 36 rotates relative to gate member 21. Cam 36 exerts a camming force on cam followers 40 to move movable end 72 of support 68, and thereby sheets 69 and 70 in unison, to a retracted position away from front face 22 to raise pins 54, 55 and 56 from film 25. Removing the camming force of cam 36 causes movable end 72, and thereby sheets 69 and 70 in unison, to move toward front face 22 for entry of pins 54, 55 and 56 into corresponding perforations 46 and 47 as sheets 69 and 70 return to normal unflexed disposition. During such movement, each part of movable end 72 is restricted from longitudinal and transverse displacement, and from rotation about an axis Z at any point transversely along free block 78.

As fixed to movable end 72 of support 68, each of first and second pins 54 and 55 has no degree of freedom linearly along or rotationally about X and Y axes, nor rotationally about a Z axis, and is only movable in unison with the other pin in a Z axis direction toward and away from the first and second points.

Figure 8:
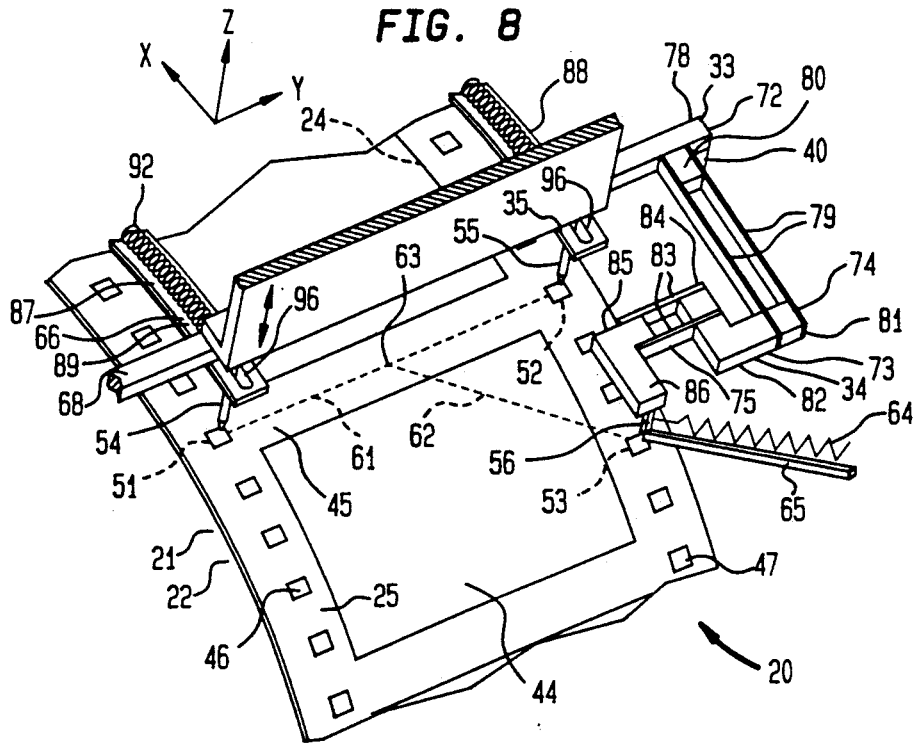
FIG. 8 is a perspective view of part of the assembly of FIG. 3.

Each flexure sheet 79 and 83 of pulling means 34, like sheets 69 and 70 of support 68 of registration means 33, comprises a resilient sheet, e.g., of metal or plastic, which cannot be displaced within its own plane but which can be flexed by a force in a direction crosswise of its plane, e.g., by the action of spring 64 pulling third pin 56 in oblique direction 62 upon its entry into a perforation 47. This occurs when movable end 72 of support 68 has moved to normal position adjacent film 25 from retracted position under the action of cam surface 37 on cam followers 40, as shown in FIGS. 11 to 13. Upon removing the flexing force, each sheet 79 and 83 normally returns to unflexed disposition as shown in FIG. 8.

Sheets 79 flex and move in unison generally in a Y axis direction independently of sheets 83, 69 and 70. Sheets 83 flex and move in unison generally in an X axis direction independently of sheets 79, 69 and 70. Sheets 69 and 79 flex and move in unison generally in a Z axis direction independently of sheets 79 and 83. This is because sheets 79 of section 74 are stationarily fixed at inner end 80 to free block 78 at movable end 72 of sheets 69 and 70, and sheets 83 of section 75 are fixed at inner end 84 in floating manner via elbow 82 to outer end 81 of sheets 83.

Thus, movable end 72 of sheets 69 and 70 which carries first and second pins 54 and 55, moves away from front face 22, outwardly in a Z axis direction, to retracted position as each sheet flexes out of its own plane under the action of cam surface 37 on cam followers 40 during pertinent movement of cam 36 relative to gate member 21. Movable end 72 of sheets 69 and 70 moves from retracted position toward front face 22, inwardly in a Z axis direction, to normal position in which first and second pins 54 and 55 enter corresponding perforations 46 and 47. Since arm 73 is carried by movable end 72, sections 74 and 75 move in unison with movable end 72 to cause third pin 56 to move to and from retracted position.

However, but for the action of pulling spring 64, sheets 79 and 83, being mounted on movable end 72, are restricted from longitudinal and transverse displacement in X and Y axes directions, and from rotation about any Z axis. Sheets 79 and 83 normally return to unflexed disposition when third pin 53 rests against stop 65 to offset the force of spring 64.

As fixed via end elbow 86 to outer end 85 of section 75, third pin 56 has no degree of freedom linearly along or rotationally about X and Y axes, nor rotationally about a Z axis, and is only movable in a Z axis direction toward and away from the third point in unison with first and second pins 54 and 55 toward and away from the first and second points. As third pin 56 engages the perforation 47 at the third point and stops moving in Z axis direction, it is displaced from stop 65 and then pulled by spring 64 toward stop 65 in oblique direction 62 for displacement in X and Y axes directions under conjoint flexing of sheets 79 and 83.

Third pin 56 is mounted via end elbow 86 on outer end 85 of section 75 coaxially to the third point and extending in a Z axis direction to move along that axis into third recess 53. The axis of third pin 56 and the axes of first and second pins 54 and 55 are all maintained parallel to each other and perpendicular to front face 22 in any position of pin movement in a Z axis direction. This is due to the restriction of sheets 69 and 70 of support 68 from longitudinal and transverse displacement. First and second pins 54 and 55 are perpendicular to first and second surfaces 48 and 49 at first and second recesses 51 and 52 along reference line 61, and third pin 56 is perpendicular to second surface 49 at third recess 53 spaced longitudinally from reference line 61.

Support 68 comprises moving means and cam 36 in conjunction with cam followers 40 comprises motion imparting means for moving such moving means from a retracted position toward front face 22. This moving means serves to move first and second pins 54 and 55 of registration means 33, and third pin 56 of pulling means 34, toward and away from front face 22. However, arm 73 of pulling means 34 may be mounted on a separate moving means, operated by separate cam followers, analogous to or duplicating the arrangement of support 68, sheets 69 and 70, free block 78 and cam followers 40 of registration means 33, for independent movement of third pin 56 toward and away from front face 22 in conjunction with the movement of first and second pins 54 and 55 as described.

Ironing and clamping means 35 includes first and second flexible force applying longitudinal bands 87 and 88 which extend adjacent first and second surfaces 48 and 49. Each of bands 87 and 88 has a proximate band end 89 carried at free block 78 of movable end 72 of support 68, and a distal band end 90 carried by a boom 91. Boom 91 is mounted on cam followers 41 which generally radially extend toward axis A and slidingly engage cam surface 37 at a rotationally spaced point on cam 36 from that at which cam followers 40 engage cam surface 37. Boom 91 is arranged for progressive movement from a retracted position toward first and second surfaces 48 and 49 of front face 22 independently of and successive to the movement of movable end 72 of support 68 toward surfaces 48 and 49. This movement occurs during pertinent rotation of cam 36 relative to gate member 21. Bands 87 and 88 are disposed to move progressively toward surfaces 48 and 49 for incrementally increasing contact with film 25 in a direction from proximate band ends 89 to distal band ends 90. Bands 87 and 88 iron film 25 progressively longitudinally in that direction and clamp perforations 46 and 47 progressively against surfaces 48 and 49.

First and second longitudinal tension coil springs 92 and 93 are arranged on first and second bands 87 and 88 remote from front face 22 to urge the bands progressively into contact with the adjacent perforations 46 and 47 along surfaces 48 and 49.

In conjunction with the resilient property of sheets 69 and 70 to return from retracted flexed to normal unflexed disposition, support springs 94 extend from free block 78 on movable end 72 of support 68 to gate member 21 outwardly of film 25 to aid in urging cam followers 40 against cam surface 37. As cam 36 is rotated, cam followers 40 ride on cam surface 37 to move free block 78 and movable end 72 of support 68 toward and away from gate member 21. This spring urged cam and follower arrangement comprises effective motion imparting means for moving movable end 72 toward and away from front surface 22 to move pins 54, 55 and 56 into and out of perforations 46 and 47 and recesses 51, 52 and 53.

Boom springs 95 extend from boom 91 to gate member 21 outwardly of film 25 to urge cam followers 41 against cam surface 37. As cam 36 is rotated, cam followers 41 ride on cam surface 37 at a different rotational location from that of cam followers 40, to move boom 91 toward and away from gate member 21 independently of the movement of movable end 72 of support 68. This spring urged cam and follower arrangement comprises effective motion imparting means for moving boom 91 to move distal band ends 90, in conjunction with the movement of movable end 72 of support 68 that moves proximate band ends 89, toward and away from front face 22 to iron film 25 progressively in the direction from proximate band ends 89 to distal band ends 90 and clamp perforations 46 and 47 progressively against surfaces 48 and 49.

As is clear from FIGS. 8 to 10, longitudinal slots 96 may be formed in proximate band ends 89 for insertion thereof onto first and second pins 54 and 55. This arrangement permits proximate band ends 89 to be positioned on the underside of free block 78 at movable end 72 for common movement therewith toward and away from surfaces 48 and 49 in a Z axis direction, with compensating longitudinal movement in an X axis direction of bands 87 and 88 relative to free block 78 during progressive ironing and clamping.

Figure 7:
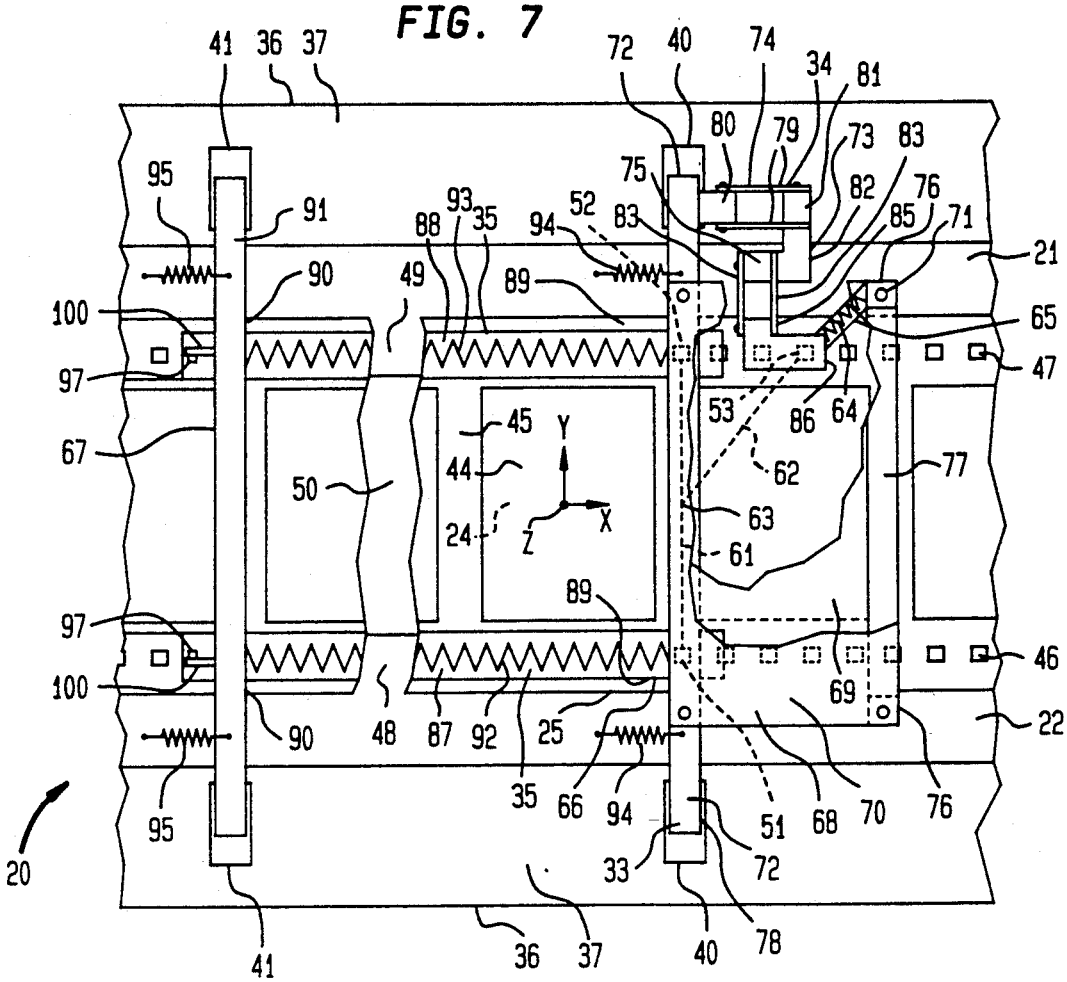
FIG. 7 is a view similar to FIG. 5 showing further details.

As is clear from FIGS. 7 and 10, transverse pins 97 may be provided on brackets 98 at distal band ends 90 for insertion in longitudinal slots 99 defined in noses 100 correspondingly provided at spaced transverse points on boom 91. This arrangement permits common movement of distal band ends 90 and boom 91 toward and away from surfaces 48 and 49 in a Z axis direction, with compensating longitudinal movement in an X axis direction of bands 87 and 88 relative to boom 91 during progressive ironing and clamping.

Longitudinal springs 92 and 93 are favorably formed as tension coil springs since these are efficiently compliant, like bands 87 and 88, for wrapping conformingly onto the arc portion of front face 22 containing aperture 24. Bands 87 and 88, e.g., formed as thin flexible metal strips, are sandwiched between film 25 and coil springs 92 and 93. This relationship prevents interaction between the spring coils and the adjacent perforations 46 and 47. It also provides a film ironing and clamping spring force that acts progressively downwardly against each row of perforations 46 and 47 on surfaces 48 and 49 along sides 57 and 58 of aperture 24 in a direction from proximate band ends 89 in the vicinity of first and second pins 54 and 55 to distal band ends 90 remote from the pins.

The progressive ironing fosters the progressive clamping under progressively distributed coil spring tension, without disturbing the desired X and Y axes registering of film 25 by pins 54, 55 and 56, as such progressive action occurs across aperture 24 in a direction away from pins 54 and 55. The image frame 44 is thus registered by pins 54 and 55 at aperture 24 and clamped by bands 87 and 88 to maintain the entire frame within stringent tolerances in focal position in straight alignment with the scan line.

The transverse sides of the registered image frame 44 are precisely perpendicular to the scan line and its longitudinal sides are precisely parallel to the scan line for incremental scanning of the full frame. The frame is wrapped around curved front face 22 adjacent aperture 24 so as to be parallel with axis A. This insures focal line flatness for all lines in the frame extending in the transverse axis Y direction. The flat lines correspond to the scan line and permit repeated scanning with focal line flatness for all such lines in the frame for maximized depth of focus scanning.

As is clear from FIGS. 11 to 13, arresting means 42 has a pair of parallel flexure sheets 101, like sheets 69 and 70, fixed against relative movement therebetween and forming a common fixed end 102 and a common movable end 103. Movable end 103 carries an arresting pin 104 and is movable from a retracted position toward front face 22 under the action of a rotary cam 105 mounted on rotary solenoid 43. Each sheet 101 comprises a resilient sheet, e.g., of metal or plastic, which cannot be displaced within its own plane but which can be flexed, e.g., by cam 105, in a direction crosswise of its plane. Upon removing the flexing force, the sheet normally returns to unflexed disposition. Sheets 101 perform like sheets 69 and 70, but are normally maintained by cam 105 in retracted position. Cam 105 is operated independently of cam 36.

Sheets 101 are fixed to arresting means 42 to move arresting pin 104 toward front face 22, inwardly in an axis Z direction, as each sheet 101 flexes out of its own plane under the camming force of cam 105, but restrict the pin from longitudinal and transverse displacement in X and Y axes directions. Pin 104 is releasably inserted into an adjacent perforation 46 on first surface 48 at a tangent point where there is no recess in front face 22, to hold film 25 stationary when gate member 21 is rotated in reverse direction. As pin 104 is limited to one degree of freedom, i.e., movement in a Z axis direction, it reduces pin and perforation wear and perforation tearing.

At the end of a scanning cycle, pins 54, 55 and 56 and bands 87 and 88 are retracted from the perforations 46 and 47 adjacent aperture 24, and pin 104 is moved into an adjacent perforation 46. Gate member 21 is then rotated in reverse direction to reposition aperture 24 at the next successive image frame 44, while film 25 is arrested by pin 104 from such return movement. Film 25 thus advances one frame 44 automatically during forward rotation of gate member 21 in a scanning cycle, and is held against return rotation when gate member 21 is reversely rotated to the starting position.

As shown in FIGS. 11 to 13, there are several stages of operation of registration means 33, pulling means 34 and ironing and clamping means 35. Illuminator 32 (shown in dashed line) is located within gate member 21 adjacent rear face 23 in line with the optical axis (not shown) yet out of the movement range of cam surface 37. Cam followers 40 and 41 are located at rotationally offset points on cam surface 37 to operate in concordant sequence.

As shown in FIG. 11, at the end of a scanning cycle, with gate member 21 stationary, cam 36 is rotated clockwise to raise pins 54, 55 and 56, and bands 87 and 88, to retracted position via action of the radially enlarged segment of cam surface 37 successively on cam followers 40 and cam followers 41.

As shown in FIG. 12, with cam 36 stationary, gate member 21 is then rotated counterclockwise to align aperture 24 with illuminator 32. Next, with gate member 21 stationary, cam 36 is rotated counterclockwise to move pins 54, 55 and 56 toward front face 22 via action of the radially reduced segment of cam surface 37 on cam followers 40. First and second pins 54 and 55 enter perforations 46 and 47 and recesses 51 and 52 at the first and second points, and third pin 56 enters a perforation 47 and recess 53 at the third point. As third pin 56 engages its perforation, it is displaced from stop 65 toward midpoint 63, and then pulled by spring 64 away from midpoint 63 to register an image frame 44 at aperture 24.

At this time, proximate ends 89 of bands 87 and 88 are moved into contact with the perforations 46 and 47 adjacent aperture 24. As the reduced segment of cam surface 37 has not yet engaged cam followers 41, distal ends 90 of bands 87 and 88 remain retracted.

As shown in FIG. 13, with gate member 21 still stationary, cam 36 continues to rotate counterclockwise to bring the reduced segment of cam surface 37 into progressively increasing engagement with cam followers 41. Bands 87 and 88 thus move progressively toward and into incrementally increasing contact with the perforations 46 and 47 adjacent aperture 24. This action occurs in the direction from proximate ends 89 to distal ends 90 of bands 87 and 88. As a result, bands 89 and 90 iron film 25 in that direction and clamp against surfaces 48 and 49 the underlying perforations 46 and 47 adjacent aperture 24. Bands 87 and 88 maintain in precise focal position at aperture 24 the image frame 44 registered therewith by pins 54, 55 and 56.

Gate member 21 and cam 36 are then rotated incrementally clockwise in unison for concordant incremental individual scan line operation from the starting position shown in FIG. 13 until gate member 21 reaches the final position shown in FIG. 11, whereupon cam 36 is rotated as before to the position shown in FIG. 11, to retract pins 54, 55 and 56, and bands 87 and 88, to the position shown in FIG. 11. Gate member 21 and cam 36 are then both returned to the position as shown in FIG. 12 for repeating the operation.

At the end of a scanning cycle, as shown in FIG. 11, arresting pin 104 is moved from retracted position to engage an adjacent perforation 46 via release of cam 105. This arrests film 25 from reverse movement, as gate member 21 rotates counterclockwise from the position shown in FIG. 11 to that shown in FIG. 12. Then, pin 104 is retracted from gate member 21 via camming action of cam 105 as shown in FIG. 12. This permits film 25 to advance incrementally during incremental clockwise movement of gate member 21 in the condition shown in FIG. 13 to the position shown in FIG. 11 as scanning proceeds. At the end of the scanning cycle, film 25 has automatically advanced one image frame 44 consequent the incremental clockwise rotation of gate member 21.

As shown in FIGS. 14 to 17, third pin 56 moves in successive stages to align the transverse pair of perforations 46 and 47 entered by first and second pins 54 and 55 at reference line 61. Desirably, third pin 56 has a sloped tip 106 and stop 65 has a specifically located rest edge 107.

Figure 17:
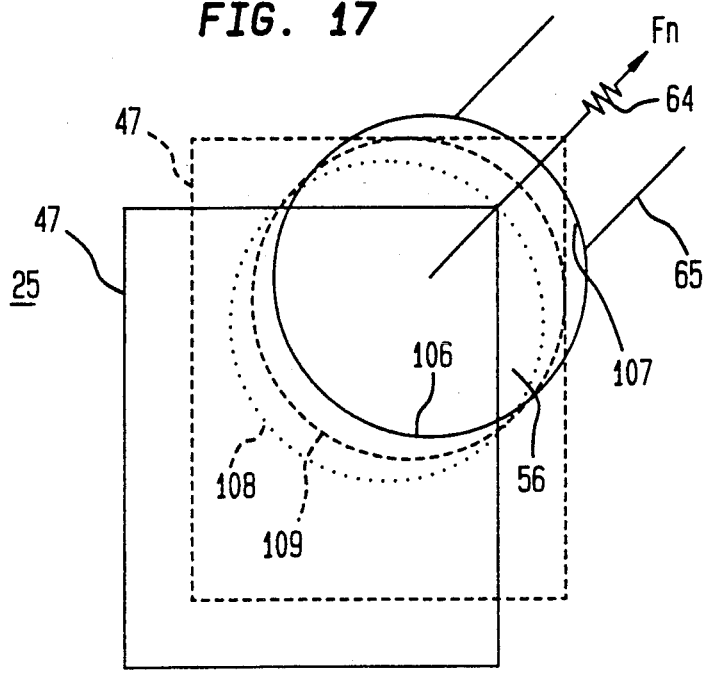
FIG. 17 is a schematic top view showing successive stages of the operation of the pulling means.

As is clear from FIGS. 14 and 17, as first and second pins 54 and 55 enter the perforations 46 and 47 overlying first and second recesses 51 and 52, sloped tip 106 of third pin 56 rides against the adjacent edge of the perforation 47 overlying third recess 53. This displaces third pin 56 from rest edge 107 of stop 65 toward midpoint 63 in oblique direction 62 under the cascading flexing of arm sections 74 and 75.

As is clear from FIGS. 15 and 17, upon entry of third pin 56 into its perforation and third recess 53 therebelow, it reaches a starting position 108 at which its shank engages the adjacent edge of the perforation. At this stage, the tension of spring 64 begins to pull third pin 56 in the opposite oblique direction 62.

As shown in FIGS. 16 and 17, the force of spring 64 moves third pin 56 away from midpoint 63 in the opposite oblique direction 62 to a final position 109, thereby pulling film 25 in that direction to achieve the desired cornering and nesting action on film 25. Third recess 53 is sized to permit unhindered movement of third pin 56 in oblique direction 62 under the pull of spring 64, i.e., in a direction away from midpoint 63 to rest edge 107.

Rest edge 107 is located relative to first, second and third pins 54, 55 and 56, so that when they enter the perforations at the first, second and third points, the image frame 44 of film 25 at aperture 24 is registered by the pins in a manner resulting in third pin 56 being located via sloped tip 106 at starting position 108 spaced slightly from rest edge 107. Spring 64 pulls third pin 56 to final position 109, which is intermediate starting position 108 and rest edge 107, for pulling film 25 via the perforation at third recess 53 to register the image frame 44 at aperture 24 precisely therewith via seating contact of the corresponding perforations with first and second pins 54 and 55. The slight spacing between final position 109 and rest edge 107 assures that pin 56 continuously exerts an oblique pull on film 25 via spring 64 during scanning, i.e., until the pins are retracted from the position shown in FIG. 13 to that shown in FIG. 11.

As pins 54, 55 and 56 are of smaller cross section than perforations 46 and 47 and recesses 51, 52 and 53, they enter the perforations and project into the recesses without hindrance. As the pins are coaxial with the first, second and third points during movement into the adjacent perforations, they avoid resting contact against the corresponding perforation margins that could cause friction between film 25 and surfaces 48 and 49 and inhibit the desired reliable seating, i.e., cornering or nesting, action.

On retracting pins 54, 55 and 56 for return of gate member 21 to starting position, third pin 56 returns to rest edge 107 of stop 65 under the force of spring 64.

As shown in FIG. 18, the image frame 44 of film 25 located in overlying registry with aperture 24 is depicted in the condition in which first, second and third pins 54, 55 and 56 have entered corresponding perforations 46 and 47 and reached first, second and third recesses 51, 52 and 53. Third pin 56 is pulled by spring 64 in oblique direction 62 at an oblique angle Ob with respect to reference line 61 to produce a resultant nesting force Fn from midpoint 63, composed of Fx and Fy force components. Force Fn as applied to film 25 resolves at midpoint 63 which is at a distance 110 in a longitudinal axis X direction between reference line 61 and a Z axis center 111 of aperture 24, and at a distance 112 in a transverse axis Y direction between midpoint 63 and center 111.

Force Fn, applied by spring 64 to third pin 56 acting on the perforation 47 that it engages, causes the perforation 46 engaged by first pin 54 to be nested or cornered on first pin 54 under a longitudinal force component and a transverse force component. It also causes the perforation 47 engaged by second pin 55 to abut thereagainst under a longitudinal force component. The image frame 44 is precisely registered with aperture 24 since the positions of pins 54 and 55 relative to aperture 24 are predetermined and fixed.

The perforations at first and second pins 54 and 55 are isolated thereby in exact alignment longitudinally in an X axis direction, parallel to reference line 61, as the common remote longitudinal sides of the perforations are pulled by the force of spring 64 longitudinally against first and second pins 54 and 55. The perforation at first pin 54 is also in exact alignment transversely in a Y axis direction, centered at midpoint 63 and thus at center 111, as the remote transverse side of the perforation thereat is pulled by spring 64 transversely against first pin 54. First pin 54 acts as a cornering pin to register the image frame 44 precisely with aperture 24.

The method of operation contemplates steps (A), (B) and (C). Step (A) comprises isolating longitudinally the pair of transversely aligned perforations 46 and 47 of film 25 by first and second pins 54 and 55 at first and second points along reference line 61 extending transversely of the longitudinal direction of the film and positioned at a fixed longitudinal location adjacent aperture 24 so as to register the image frame 44 therewith.

Step (B) comprises pulling the perforation isolated film at a third point spaced longitudinally from the second point under a tension force in direction 62 oblique to reference line 61 to produce a resultant force Fn on the perforation 46 at the first point and on the perforation 47 at the second point for registering precisely the image frame with the aperture by the pins.

Step (C) comprises progressively longitudinally ironing and clamping the so pulled film in a direction from a proximate longitudinal location adjacent longitudinal side 60 of aperture 24 to a distal longitudinal location adjacent longitudinal side 59 thereof to maintain the image frame in precise focal position thereat. Ironing and clamping typically occurs from a proximate location adjacent the first and second points and remote from the third point to a distal location remote from all three points.

As is clear from FIG. 18, the tension force of spring 64 is applied to produce a resultant force Fn on film 25 at transverse midpoint 63 in alignment with reference line 61. This corresponds to a combination of longitudinal force component Fx and transverse force component Fy acting on the perforation 46 at the first point to corner the perforation against first pin 54 in both longitudinal and transverse X and Y axes directions, and longitudinal force component Fx acting on the perforation 47 at the second point to align the perforation against second pin 55 in a longitudinal X axis direction.

Generally, force component Fx has a greater magnitude than force component Fy because longitudinal force component Fx must seat both perforations 46 and 47 against both first and second pins 54 and 55. Transverse force component Fy need only seat perforation 46 against first pin 54. In the nested condition of film 25, second pin 55 is spaced from both longitudinal sides of perforation 47 while first pin 54 is spaced from the longitudinal side of perforation 46 opposite its nested longitudinal side.

As pins 54, 55 and 56 are undersized relative to perforations 46 and 47, and recesses 51, 52 and 53, excess pin and perforation wear and perforation tearing are avoided. This especially true since the pins are generally restricted to only one degree of freedom, i.e., to move in given Z axes directions. It is only when sloped tip 106 of third pin 56 slides against the edge of its adjacent perforation 47 that the pull of spring 64 is exerted.

First and second pins 54 and 55, which have no degrees of freedom in the X and Y axes directions, serve to locate the image frame 44 in the X and Y axes directions, and at a conjoint rotational position about a corresponding Z axis. Third pin 56 under the oblique pulling force of spring 64 serves to apply resultant force Fn, i.e., in a direction substantially parallel to film 25, to cause first pin 54 to locate film 25, and thus the image frame 44 at aperture 24, in the X and Y directions, and second pin 55 to locate the film at the conjoint rotational position about a Z axis coaxial with first pin 55.

As they are undersized relative to the perforations, the pins may be retracted freely, without pulling the film to strip the perforations from the pins. This also avoids excess pin and perforation wear and perforation tearing.

After step (A), step (B) is generally effected before step (C). However, according to a special feature, as disclosed and claimed in said copending U.S. application Ser. No. 903,837, filed simultaneously herewith (Douglass L. Blanding), entitled FILM REGISTRATION GATE ASSEMBLY, steps (B) and (C) may be effected repeatedly sequentially for incrementally increasingly precise image frame registry with and focal positioning at the aperture.

This is attained by concordantly shaping cam surface 37 to effect repeated sequential (B) and (C) steps. In a (C) step, cam 36 is rotated an increment for cam surface 37 to raise free block 78 via cam followers 40 and lower boom 91 via cam followers 41, for progressive ironing and clamping by bands 87 and 88 unhindered by third pin 56 pulling. In a (B) step, cam 36 is rotated an increment for cam surface 37 to lower free block 78 via cam followers 40 and raise boom 91 via cam followers 41, for third pin 56 pulling unhindered by ironing and clamping by bands 87 and 88.

The temporary removal of bands 87 and 88 on raising boom 91 at one stage allows spring 64 to pull third pin 56 to register the image frame 44 at aperture 24 more easily, free from ironing and clamping force. The temporary removal of third pin 56 on raising free block 78 at another stage allows bands 87 and 88 to iron and clamp film 25 more smoothly, free from pulling force. By one or more sequentially repeated steps of temporarily removing one such force for undisturbed applying of the other, an increasingly more precise focal positioning seating and registering of the image frame at the aperture is incrementally achieved. These alternate (B) and (C) steps eliminate essentially completely any minor bowing or distortion of the image frame at the aperture.

To facilitate these alternate steps (B) and (C), separate cams (not shown) may be used to control the individual operation of cam followers 40 and cam followers 41, in place of common cam 36.

When assembly 20 is in the state shown in FIG. 12, step (A) is effected, and then steps (B) and (C) are repeated successively one or more times. After completing the succession, assembly 20 is provided in the state shown in FIG. 13 for a scanning cycle.

Pulling means 34 and proximate end 66 of ironing and clamping means 35 may each be mounted on a separate support, similar to support 68, for independent movement of third pin 56 and proximate end 66 toward and away from front face 22, with separate cam followers, like cam followers 40, to control such movement.

Other means than motor and solenoid driven cam mechanisms can be used to operate the registration means, pulling means, ironing and clamping means and arresting means, such as lever drives, hydraulic rams, and the like. Conventional control means are used to control the assembly for relative movement, and to operate the registration means, pulling means, ironing and clamping means, and arresting means. Alternatively, means other than cam followers 40 and 41 may be used to actuate the ironing and clamping means 35 so that film may be loaded into the gate in the middle of a roll.

While the pulling means is shown in the form of a pin that engages a perforation for pulling the film in the oblique direction, any other means for gripping and pulling the film under resilient tension, or for pushing the film, may be used.

Also, while the ironing and clamping means is shown in the form of longitudinal flexible bands, e.g., with longitudinal springs to urge them progressively into contact with the film, any other gate member conforming longitudinal force applying means may be used. Such longitudinal means must "iron out" and clamp the aperture registered image frame to the gate member front face to insure film straightness along the scan line for the complete aperture to scan (or record, etc.) the full image frame thereat.

Besides flexure sheets, any other means may be used for Z axis movement of the registration means, pulling means, ironing and clamping means and arresting means, while preventing X and Y axes displacement, and for oblique displacement of the pulling means.

The assembly of the invention achieves extremely precise location of the image frame at the gate member aperture and maintains the image frame registered with the aperture in extremely straight disposition along the scan line so as to remain in sharp focus during, e.g., high resolution electronic, scanning, printing, recording, or like operations. Stringent tolerances of total film flatness of 0.0015 inch, with an occasional maximum of 0.0020 inch, and frame to frame registration at the gate aperture within 0.00025 inch (one pixel), are attainable therewith, while avoiding excess pin and perforation wear and perforation tearing.

In tests performed on the assembly of FIGS. 1 and 3-18, the image frames were found to be consistently registered at the aperture within a total tolerance of 0.00012 inch. Using a laser interferometer, twenty three image frames of 4 perforations per frame length increment were measured for film flatness, producing an average of 0.0008 inch, with a 0.0006 to 0.0013 inch range of measurements. Twenty three image frames of 8 perforations per frame length increment were likewise measured for film flatness, producing an average of 0.0012 inch, with a 0.0006 to 0.0019 inch range of measurements. Using a microscope, and confirming the results with a high resolution electronic scanner, frame to frame registration was measured and found to be within a tolerance of 0.00012 inch (0.003 mm). Frame images "written" on a recorder, using the assembly of FIG. 2, and then projected on a projector, have also displayed a more than acceptable steadiness.

Due to the fixed location of the first and second pins coaxial with the first and second points in corresponding Z axis directions, and their restraint from displacement in X and Y axes directions, all image frames are registered in precisely the same position at the aperture or positioning location via nesting of the perforations at said points in precisely the same positions against said pins.

The gate member of the assembly of the invention may be used with strip film having any number of perforations per image frame increment, such as 4 or 8 perforations per successive image frame. However, the gate member and associated parts may be exchanged with another to accommodate a different type film, e.g., having a different perforation style and/or image frame length. The compact arrangement of the registration means, pulling means, ironing and clamping means and arresting means permits positioning of the assembly in close proximity to the elements of the scanner or other system.

A curved gate member is typically more desirable for scanning, due to the high accuracy of positioning the image frame at the aperture to maintain sharp focus of all portions thereof during relative movement between the gate member and scanner or other system used. However, the gate member may also be of flat configuration as conventionally used for scanning operations. In this case, the gate member front face conforming longitudinal force applying resilient tension means forming the ironing and clamping means is equally able to "iron out" and clamp the aperture registered image frame to the flat front face of the gate member to insure film straightness along the scan line for the complete aperture to scan (or record, etc.) the full image frame thereat.

Accordingly, it can be appreciated that the specific embodiments described are merely illustrative of the general principles of the invention. Various modifications may be provided consistent with the principles set forth.

What is claimed is:

1. A film registration and ironing gate assembly, for positioning longitudinally successive, uniform rectangular frames bounded between a pair of parallel rows of equidistant, uniform rectangular edge perforations of common cross sectional size, on a strip film, each perforation in one row being transversely aligned with a corresponding perforation in the other row, said gate assembly comprising:
   a gate member having a front face and a rear face with a rectangular, focal positioning location, the positioning location being complemental to an image frame of the strip film and having longitudinally extending first and second transverse sides and transversely extending third and fourth longitudinal sides, and the front face having film perforation seating, and first and second surfaces correspondingly extending longitudinally along the first and second transverse sides;
   registration means comprising first and second pins of smaller cross sectional size than the film perforations and disposed perpendicular to the surfaces in fixed alignment with a reference line extending transversely from a first point on the first surface to a second point on the second surface, and at a fixed longitudinal location adjacent one longitudinal side of the positioning location, and corresponding to the positioning of a pair of transversely aligned film perforations on the surfaces at the first and second points, the pins being arranged for entry into the perforations;
   force applying means for engaging the film at a third point spaced longitudinally from the second point for moving the film in a direction oblique to the reference line, upon entry of the pins into the perforations, to produce a resultant force on the perforation at the first point and on the perforation at the second point for registering precisely a film frame with the positioning location by the pins; and
   longitudinally extending ironing and clamping means adjacent the front face and having a proximate end adjacent one longitudinal side of the positioning location and a distal end adjacent the other longitudinal side thereof, and arranged for moving from a retracted position progressively toward the surfaces for incrementally increasing contact with the film in a direction from the proximate end to the distal end to iron the film in such direction and clamp against the surfaces the film perforations adjacent the positioning location for maintaining the frame in precise focal position at the positioning location.

2. The assembly of claim 1 wherein the force applying means comprises resilient tension means arranged for producing a resultant force on the film at a transverse midpoint in alignment with the reference line corresponding to a combination of a longitudinal force component and a transverse force component acting on the perforation at the first point to corner the perforation against the first pin in both longitudinal and transverse directions, and a longitudinal force component acting on the perforation at the second point to align the perforation against the second pin in the longitudinal direction.

3. The assembly of claim 2 wherein the third point corresponds to the positioning of a third film perforation on the second surface, and the pulling means comprises a third pin arranged for entry into the perforation at the third point and for unhindered displacement in the oblique direction.

4. The assembly of claim 3 wherein the pulling means comprises a cascade flexure cantilever arm including first and second unitary flexure arm floating sections, each having a pair of parallel flexure sheets fixed against relative movement therebetween and forming a common inner end and a common outer end, the first arm section extending in the longitudinal direction and the second arm section extending in the transverse direction;
   the inner end of one arm section being fixed against longitudinal and transverse displacement and the outer end of that one arm section being fixed to the inner arm of the other arm section and the outer end of that other arm section extending adjacent the second surface;
   the third pin depending from the outer end of that other arm section perpendicular to the second surface at the third point, and the arm sections being independently flexible to displace the third pin in the oblique direction.

5. The assembly of claim 3 further comprising spring means for pulling the third pin in the oblique direction.

6. The assembly of claim 3 wherein the pins are arranged adjacent the front face for moving from a retracted position toward the front face for entry into the perforations.

7. The assembly of claim 6 further comprising moving means for moving the pins.

8. The assembly of claim 7 wherein the moving means comprises a unitary flexure cantilever support having a pair of parallel flexure sheets fixed against relative movement therebetween and forming a common fixed end and a common movable end movable from a retracted position toward the front face;
   the first and second pins depending from the movable end perpendicular to the surfaces at the first and second points, and the sheets being flexible to move the pins in unison while restricting each pin from longitudinal and transverse displacement.

9. The assembly of claim 8 further comprising a cascade flexure cantilever arm fixed to the movable end of the support remote from the first and second pins and including first and second unitary flexure arm floating sections, each having a pair of parallel flexure sheets fixed against relative movement therebetween and forming a common inner end and a common outer end, the first arm section extending in the longitudinal direction and the second arm section extending in the transverse direction;
   the inner end of one arm section being fixed to the movable end of the support and the outer end of that one arm section being fixed to the inner arm of the other arm section and the outer end of that other arm section extending adjacent the second surface;

the third pin depending from the outer end of that other arm section perpendicular to the second surface at the third point, and the arm sections being independently flexible to displace the third pin in the oblique direction.

10. The assembly of claim 9 further comprising spring means for pulling the third pin in the oblique direction.

11. The assembly of claim 10 further comprising a pin stop arranged to limit the extend of displacement of the third pin away from the first and second pins in the oblique direction.

12. The assembly of claim 9 further comprising motion imparting means for moving the movable end of the support to move the pins.

13. The assembly of claim 9 wherein first, second and third clearance recesses are defined in the surfaces at the first, second and third points, and the pins are arranged to move into the recesses upon entering the perforations.

14. The assembly of claim 9 wherein the ironing and clamping means comprises corresponding first and second flexible force applying bands extending adjacent the first and second surfaces, each band having a proximate end carried by the movable end of the support and a distal end carried by a boom for progressive movement from a retracted position toward the surfaces independently of and successive to the movement of the movable end of the support, the bands being disposed to move progressively toward the surfaces for incrementally increasing contact with the film in a direction from the proximate ends to the distal ends of the bands to iron the film progressively in such direction and clamp the film perforations progressively against the surfaces.

15. The assembly of claim 14 wherein the ends of the bands are carried at the movable end of the support and at the boom so as to permit compensating longitudinal movement of the bands relative to the movable end and to the boom.

16. The assembly of claim 14 wherein longitudinal spring means are arranged on the bands to urge the bands progressively into contact with the adjacent film perforations for ironing and clamping action.

17. The assembly of claim 14 further comprising motion imparting means for moving the boom to move the distal ends of the bands.

18. The assembly of claim 14 wherein the gate member has a curved front face corresponding to at least an arc portion of a cylinder having an axis parallel to the longitudinal sides of the aperture, and the bands are arranged to conform to the curved front face in the vicinity of the positioning location.

19. The assembly of claim 1 wherein the ironing and clamping means comprises corresponding first and second flexible force applying bands extending adjacent the first and second surfaces, each band having a proximate end adjacent one longitudinal side of the positioning location and a distal end adjacent the other longitudinal side thereof, the bands being disposed for progressive movement from a retracted position toward the surfaces for incrementally increasing contact with the film in a direction from the proximate ends to the distal ends of the bands to iron the film progressively in such direction and clamp the film perforations progressively against the surfaces.

20. The assembly of claim 19 wherein longitudinal spring means are arranged on the bands to urge the bands progressively into contact with the adjacent film perforations for ironing and clamping action.

21. The assembly of claim 19 wherein the gate member has a curved front face corresponding to at least an arc portion of a cylinder having an axis parallel to the longitudinal sides of the positioning location, and the bands are arranged to conform to the curved front face in the vicinity of the positioning location.

22. The assembly of claim 1 wherein the gate member has a curved front face corresponding to at least an arc portion of a cylinder having an axis parallel to the longitudinal sides of the aperture, the gate member is mounted for forward rotation to move through an arc portion of a single revolution corresponding to the longitudinal spacing of the film frames, with the film clamped to the gate member for movement therewith, and an arresting pin is provided for releasable insertion into a film perforation to arrest the film from return rotational movement, upon moving the pins and ironing and clamping means away from the film perforations for reverse rotation of the gate member through said arc portion to reposition the aperture at the next successive film frame, for thereby automatically advancing the film one frame during each forward rotation of the gate member.

23. The assembly of claim 1 wherein the positioning location includes an aperture having substantially the same configuration as said image frame formed through said gate member.

* * * * *